United States Patent
Hayashi et al.

(10) Patent No.: US 10,538,670 B2
(45) Date of Patent: Jan. 21, 2020

(54) PIGMENT DISPERSION LIQUID AND INKJET INK

(71) Applicant: FUJIFILM Corporation, Tokyo (JP)

(72) Inventors: Shinya Hayashi, Kanagawa (JP);
Yoshiaki Nagata, Kanagawa (JP);
Kazufumi Omura, Kanagawa (JP);
Kazushi Furukawa, Kanagawa (JP);
Keiichi Tateishi, Kanagawa (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 16/252,009

(22) Filed: Jan. 18, 2019

(65) Prior Publication Data
US 2019/0153231 A1   May 23, 2019

Related U.S. Application Data

(63) Continuation of application No. PCT/JP2017/026146, filed on Jul. 19, 2017.

(30) Foreign Application Priority Data

Jul. 26, 2016  (JP) .................................. 2016-146121
Dec. 22, 2016  (JP) .................................. 2016-249735

(51) Int. Cl.
| C09B 67/00 | (2006.01) |
| C09B 33/12 | (2006.01) |
| C09B 35/03 | (2006.01) |
| C09D 11/322 | (2014.01) |
| C09B 67/46 | (2006.01) |

(52) U.S. Cl.
CPC ............ C09B 67/009 (2013.01); C09B 33/12 (2013.01); C09B 35/03 (2013.01); C09D 11/322 (2013.01)

(58) Field of Classification Search
None
See application file for complete search history.

(56) References Cited

U.S. PATENT DOCUMENTS

| 8,080,067 B2 * | 12/2011 | Tateishi ............... C07D 403/14 106/31.6 |
| 8,222,326 B2 * | 7/2012 | Morimoto ............ C09B 29/0025 347/21 |
| 8,399,545 B2 * | 3/2013 | Tateishi ............... C09B 29/0037 523/160 |
| 8,580,025 B2 * | 11/2013 | Tateishi ................ C09B 33/12 106/31.77 |
| 8,609,747 B2 * | 12/2013 | Tateishi ................ C09B 43/16 523/160 |
| 8,641,785 B2 * | 2/2014 | Tateishi ................ C09B 33/12 106/31.13 |
| 9,359,502 B2 * | 6/2016 | Tateishi ................ C09B 33/12 |
| 9,359,503 B2 * | 6/2016 | Tateishi ............... C09D 11/326 |
| 2008/0146727 A1* | 6/2008 | Yatake ................. C09D 11/326 524/515 |
| 2011/0017099 A1 | 1/2011 | Tateishi et al. |
| 2011/0021763 A1 | 1/2011 | Tateishi et al. |
| 2011/0023753 A1 | 2/2011 | Tateishi |
| 2011/0166267 A1 | 7/2011 | Tateishi et al. |
| 2012/0165436 A1 | 6/2012 | Tanaka et al. |
| 2012/0165437 A1 | 6/2012 | Tateishi et al. |
| 2014/0141250 A1 | 5/2014 | Tateishi et al. |
| 2015/0042732 A1 | 2/2015 | Holbrook et al. |

FOREIGN PATENT DOCUMENTS

| EP | 2 671 926 A1 | 12/2013 |
| JP | 2010-77400 A | 4/2010 |
| JP | 2011-57732 A | 3/2011 |
| JP | 2011-74376 A | 4/2011 |
| JP | 2012-97167 A | 5/2012 |

(Continued)

OTHER PUBLICATIONS

International Search Report dated Sep. 5, 2017 issued by the International Searching Authority in counterpart International Application No. PCT/JP2017/026146 (PCT/ISA/210).

Written Opinion dated Sep. 5, 2017 issued by the International Searching Authority in counterpart International Application No. PCT/JP2017/026146 (PCT/ISA/237).

(Continued)

*Primary Examiner* — Helene Klemanski
(74) *Attorney, Agent, or Firm* — Sughrue Mion, PLLC

(57) ABSTRACT

Provided are a pigment dispersion liquid including a pigment, a polymer dispersant, and water; and an inkjet ink containing the pigment dispersion liquid. The pigment contains a compound represented by General Formula (1) described in the specification, a tautomer thereof, or a salt of the compound or the tautomer. The polymer dispersant contains a polymer compound which has a repeating unit represented General Formula (2-1) and a repeating unit represented General Formula (2-2) described in the specification, and having a structure represented by General Formula (3) introduced into at least one terminal of a main chain:

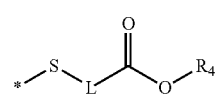

(3)

in General Formula (3), L represents a linking group; $R_4$ represents a substituted or unsubstituted alkyl group, a substituted or unsubstituted aryl group, or a substituted or unsubstituted heterocyclic group; and the symbol * represents a linking bond.

14 Claims, No Drawings

(56) References Cited

FOREIGN PATENT DOCUMENTS

| | | |
|---|---|---|
| JP | 2014-162875 A | 9/2014 |
| JP | 2015-520013 A | 7/2015 |
| JP | 2016-160331 A | 9/2016 |
| WO | 2009/110557 A1 | 9/2009 |
| WO | 2013/018680 A1 | 2/2013 |

OTHER PUBLICATIONS

International Preliminary Report on Patentability dated Aug. 9, 2018 issued by the International Searching Authority in counterpart International Application No. PCT/JP2017/026146 (PCT/IPEA/409).

Communication dated Jun. 19, 2019, issued by the European Patent Office in counterpart European Application No. 17834127.7.

* cited by examiner

PIGMENT DISPERSION LIQUID AND INKJET INK

CROSS REFERENCE TO RELATED APPLICATIONS

This is a continuation of International Application NO. PCT/JP2017/26146 filed on Jul. 19, 2017, and claims priorities from Japanese Patent Application (JP2016-146121) filed on Jul. 26, 2016 and Japanese Patent Application (JP2016-249735) filed on Dec. 22, 2016, the disclosures of which are incorporated herein by reference.

BACKGROUND OF THE INVENTION

1. Field of the Invention

The present invention relates to a pigment dispersion liquid and an inkjet ink.

2. Description of the Related Art

Azo pigments have excellent hues and tinctorial power, which are chromatic characteristics, and therefore, azo pigments have been widely used in various fields. For example, a pigment dispersion liquid obtained by dispersing an azo pigment in water is used for inkjet ink and the like.

Regarding a water-based pigment dispersion liquid including an azo pigment, JP2011-074376A describes a water-based pigment dispersion including an azo pigment having a particular structure and a vinyl polymer having a repeating unit derived from a (meth)acrylic acid ester.

In JP2014-162875A, a water-based pigment dispersion liquid including an azo pigment having a particular structure, a repeating unit derived from a (meth)acrylic acid ester, and a polymer dispersant having a repeating unit derived from (meth)acrylic acid is described.

SUMMARY OF THE INVENTION

The water-based pigment dispersion liquids of JP2011-074376A and JP2014-162875A exhibit excellent performance as described in JP2011-074376A and JP2014-162875A; however, it was found that in a case in which the water-based pigment dispersion liquids are used as inkjet inks and are continuously jetted, the nozzles of the head of an inkjet printer may be clogged. It was also found that there is still room for further investigation with regard to the drop velocity.

An object to be achieved by the invention is to provide a pigment dispersion liquid that has excellent continuous jetting properties and drop velocity at the time of printing with an inkjet printer and has excellent light resistance, and an inkjet ink.

The object of the invention described above was achieved by the following means.

<1> A pigment dispersion liquid comprising:
a pigment;
a polymer dispersant; and
water,
wherein the pigment is a pigment including a compound represented by General Formula (1), a tautomer thereof, or a salt of the compound or the tautomer, and
the polymer dispersant includes a polymer compound having a repeating unit represented by General Formula (2-1) and a repeating unit represented by General Formula (2-2), and having a structure represented by General Formula (3) introduced into at least one terminal of a main chain,

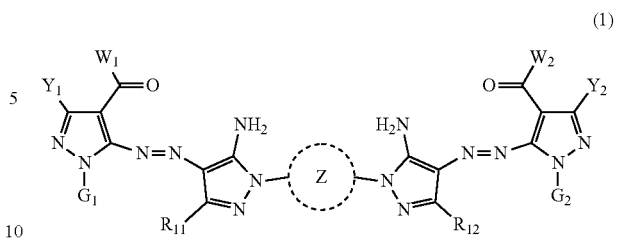

(1)

in General Formula (1),
Z represents a 5-membered heterocyclic ring or a 6-membered heterocyclic ring, both of which may have a substituent,
$Y_1$, $Y_2$, $R_{11}$, and $R_{12}$ each independently represent a hydrogen atom or a substituent,
$G_1$ and $G_2$ each independently represent a hydrogen atom, a substituted or unsubstituted alkyl group, a substituted or unsubstituted aralkyl group, a substituted or unsubstituted alkenyl group, a substituted or unsubstituted alkynyl group, a substituted or unsubstituted aryl group, or a substituted or unsubstituted heterocyclic group, and
$W_1$ and $W_2$ each independently represent a substituted or unsubstituted alkoxy group, a substituted or unsubstituted amino group, a substituted or unsubstituted alkyl group, or a substituted or unsubstituted aryl group,

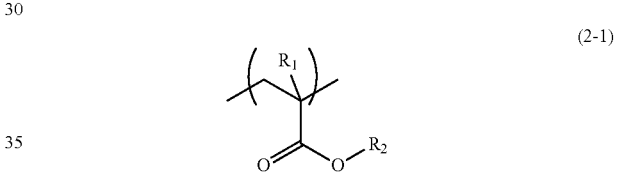

in General Formula (2-1), $R_1$ represents a hydrogen atom, a methyl group, or a substituted methyl group, and $R_2$ represents a substituted or unsubstituted alkyl group, a substituted or unsubstituted aralkyl group, or a substituted or unsubstituted aryl group, in General Formula (2-2), $R_3$ represents a hydrogen atom, a methyl group, or a substituted methyl group, and M represents a hydrogen atom or a counter cation, and

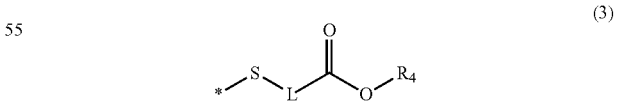

(3)

in General Formula (3). L represents a linking group, $R_4$ represents a substituted or unsubstituted alkyl group, a substituted or unsubstituted aryl group, or a substituted or unsubstituted heterocyclic group, and the symbol * represents a linking bond.

<2> The pigment dispersion liquid according to <1>, wherein the weight-average molecular weight of the polymer dispersant is 5,000 to 50,000.

<3> The pigment dispersion liquid according to <1> or <2>, wherein the weight-average molecular weight of the polymer dispersant is 7.000 to 20,000.

<4> The pigment dispersion liquid according to any one of <1> to <3>, wherein the polymer dispersant has an acid value of from 1.6 mmol/g to 2.6 mmol/g.

<5> The pigment dispersion liquid according to any one of <1> to <4>, wherein the polymer dispersant has an acid value of from 1.7 mmol/g to 2.2 mmol/g.

<6> The pigment dispersion liquid according to any one of <1> to <5>, wherein the pigment is a pigment including at least one of a compound represented by Formula (d1), Formula (d2), or Formula (d3), a tautomer thereof, or a salt of the compound or the tautomer.

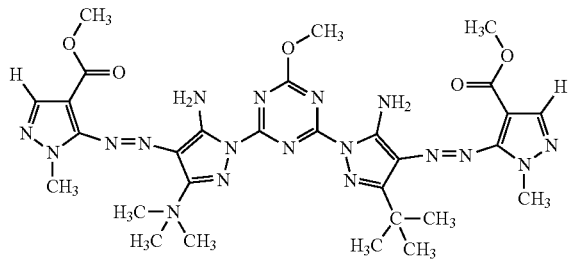
(d1)

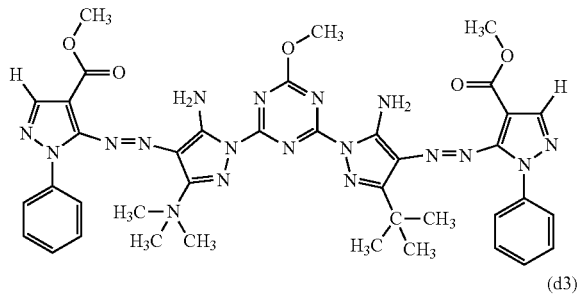
(d2)

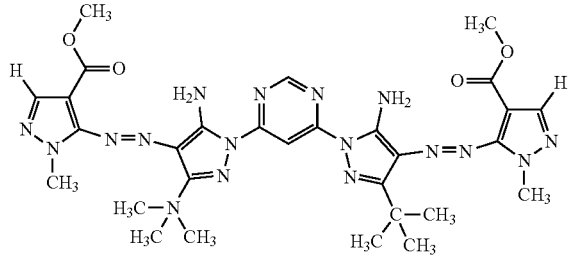
(d3)

<7> The pigment dispersion liquid according to <6>, wherein the pigment is a pigment including a compound represented by Formula (d1), a tautomer thereof, or a salt of the compound or the tautomer.

<8> The pigment dispersion liquid according to any one of <1> to <7>, wherein $R_4$ in General Formula (3) represents a substituted or unsubstituted alkyl group, or a substituted or unsubstituted aryl group.

<9> The pigment dispersion liquid according to any one of <1> to <8>, wherein L in General Formula (3) represents a substituted or unsubstituted alkylene group, a substituted or unsubstituted arylene group, or a substituted or unsubstituted divalent heterocyclic group.

<10> The pigment dispersion liquid according to any one of <1> to <9>, wherein $R_4$ in General Formula (3) represents a substituted or unsubstituted alkyl group having 1 to 10 carbon atoms.

<11> The pigment dispersion liquid according to any one of <1> to <10>, wherein L in General Formula (3) represents a substituted or unsubstituted alkylene group having 1 to 5 carbon atoms.

<12> The pigment dispersion liquid according to any one of <1> to <11>, wherein, in General Formula (2-1), $R_1$ represents a methyl group, and $R_2$ represents a benzyl group.

<13> The pigment dispersion liquid according to any one of <1> to <12>, further comprising at least one solvent selected from glycerin, ethylene glycol, diethylene glycol, triethylene glycol, polyethylene glycol, 1,3-propanediol, 1,4-butanediol, 1,2-hexanediol, hexylene glycol, diglycerol, dipropylene glycol, 2-pyrrolidone, triethylene glycol monobutyl ether, propylene glycol monomethyl ether acetate, or isopropanol.

<14> An inkjet ink comprising the pigment dispersion liquid according to any one of <1> to <13>.

According to the invention, a pigment dispersion liquid that has excellent continuous jetting properties and drop velocity at the time of printing with an inkjet printer and has excellent light resistance, and an inkjet ink can be provided.

DESCRIPTION OF THE PREFERRED EMBODIMENTS

[Pigment Dispersion Liquid]

The pigment dispersion liquid according to the embodiment of the invention is a pigment dispersion liquid containing a pigment, a polymer dispersant, and water, in which the pigment is a pigment including a compound represented by General Formula (1), a tautomer thereof, or a salt of the compound or the tautomer, and the polymer dispersant includes a polymer compound having a repeating unit represented by General Formula (2-1) and a repeating unit represented by General Formula (2-2), and having a structure represented by General Formula (3) introduced into at least one terminal of a main chain.

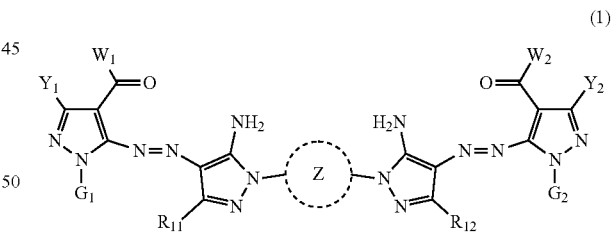
(1)

In General Formula (1),

Z represents a 5-membered heterocyclic ring or a 6-membered heterocyclic ring, both of which may have a substituent;

$Y_1$, $Y_2$, $R_{11}$, and $R_{12}$ each independently represent a hydrogen atom or a substituent;

$G_1$ and $G_2$ each independently represent a hydrogen atom, a substituted or unsubstituted alkyl group, a substituted or unsubstituted aralkyl group, a substituted or unsubstituted alkenyl group, a substituted or unsubstituted alkynyl group, a substituted or unsubstituted aryl group, or a substituted or unsubstituted heterocyclic group; and $W_1$ and $W_2$ each independently represent a substituted or unsubstituted alkoxy group, a substituted or unsubstituted amino group, a substituted or unsubstituted alkyl group, or a substituted or unsubstituted aryl group.

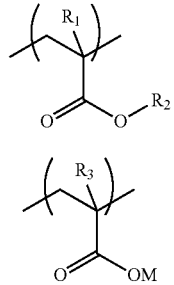
(2-1)

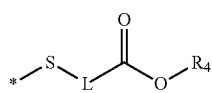
(2-2)

In General Formula (2-1), $R_1$ represents a hydrogen atom, a methyl group, or a substituted methyl group; and $R_2$ represents a substituted or unsubstituted alkyl group, a substituted or unsubstituted aralkyl group, or a substituted or unsubstituted aryl group.

In General Formula (2-2), $R_3$ represents a hydrogen atom, a methyl group, or a substituted methyl group; and M represents a hydrogen atom or a counter cation.

(3)

*—S—L—C(=O)—O—$R_4$

In General Formula (3). L represent a linking group; $R_4$ represents a substituted or unsubstituted alkyl group, a substituted or unsubstituted aryl group, or a substituted or unsubstituted heterocyclic group; and the symbol * represents a linking bond.

The detailed reason why the pigment dispersion liquid according to the embodiment of the invention has excellent continuous jetting properties at the time of printing with an inkjet printer is not clearly known; however, the inventors of the invention speculate the cause as follows.

It is considered that jetting failure at the time of continuously jetting an ink occurs because the dispersant included in the pigment dispersion liquid is detached from the pigment, the dispersion stability of the pigment is decreased, and thereby aggregates are generated inside the nozzles of the head. In regard to the pigment dispersion liquid according to the embodiment of the invention, it is speculated that in a case in which a polymer dispersant having an ester group introduced into at least one terminal of the main chain is used for an azo pigment that has formed intramolecular hydrogen bonding around an amino group as a base point, the adsorption power of the dispersant to the pigment is increased, aggregation of pigment molecules is suppressed, and thereby, satisfactory continuous jetting properties of the ink are obtained.

In the following description, various components used in the pigment dispersion liquid according to the embodiment of the invention will be explained.

(Pigment)

The pigment incorporated into the pigment dispersion liquid according to the embodiment of the invention is a pigment including a compound represented by General Formula (1), a tautomer thereof, or a salt of the compound or the tautomer.

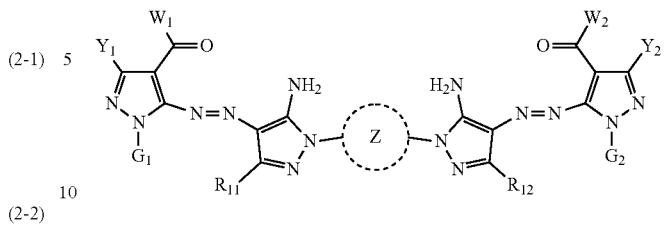
(1)

In General Formula (1),

Z represents a 5-membered heterocyclic ring or a 6-membered heterocyclic ring, both of which may have a substituent;

$Y_1$, $Y_2$, $R_{11}$, and $R_{12}$ each independently represent a hydrogen atom or a substituent;

$G_1$ and $G_2$ each independently represent a hydrogen atom, a substituted or unsubstituted alkyl group, a substituted or unsubstituted aralkyl group, a substituted or unsubstituted alkenyl group, a substituted or unsubstituted alkynyl group, a substituted or unsubstituted aryl group, or a substituted or unsubstituted heterocyclic group; and $W_1$ and $W_2$ each independently represent a substituted or unsubstituted alkoxy group, a substituted or unsubstituted amino group, a substituted or unsubstituted alkyl group, or a substituted or unsubstituted aryl group.

The compound represented by General Formula (1) is likely to form intramolecular and intermolecular interaction (hydrogen bonding or π-π stacking) due to the particular structure of the compound, has excellent light resistance, has low solubility in water, an organic solvent or the like, and can be used as a preferred form of azo pigment. The pigment is used in a state of being dispersed as particles such as molecular aggregates in a medium.

In General Formula (1), $W_1$ and $W_2$ each independently represent a substituted or unsubstituted alkoxy group, a substituted or unsubstituted amino group, a substituted or unsubstituted alkyl group, or a substituted or unsubstituted aryl group.

The alkyl group in the case in which $W_1$ and $W_2$ each represent a substituted or unsubstituted alkyl group may be a linear, branched or cyclic, substituted or unsubstituted alkyl group, and this also includes a cycloalkyl group, a bicycloalkyl group, a tricyclo structure, and the like. The alkyl group within a substituent that will be explained below (for example, an alkyl group of an alkoxy group or an alkylthio group) also represents an alkyl group under such conception. A linear or branched, substituted or unsubstituted alkyl group is preferably a substituted or unsubstituted alkyl group having 1 to 30 carbon atoms, and examples include a methyl group, an ethyl group, an n-propyl group, an i-propyl group, an n-butyl group, an i-butyl group, an s-butyl group, a t-butyl group, an n-octyl group, an eicosyl group, a 2-chloroethyl group, a 2-cyanoethyl group, and a 2-ethylhexyl group. A substituted or unsubstituted cycloalkyl group is preferably a substituted or unsubstituted cycloalkyl group having 3 to 30 carbon atoms, and examples include a cyclohexyl group, a cyclopentyl group, and a 4-n-dodecylcyclohexyl group. A substituted or unsubstituted bicycloalkyl group is preferably a substituted or unsubstituted bicycloalkyl group having 5 to 30 carbon atoms, that is, a monovalent group obtained by removing one hydrogen atom from a substituted or unsubstituted bicycloalkane having 5 to 30 carbon atoms, and examples include a bicyclo[1,2,2]heptan-2-yl group and a bicyclo[2,2,2]octan- 3-yl group. The substituent which may be carried by an alkyl group will be described in more detail below.

The alkoxy group in the case in which $W_1$ and $W_2$ each represent a substituted or unsubstituted alkoxy group is preferably an alkoxy group having 1 to 30 carbon atoms, more preferably an alkoxy group having 1 to 8 carbon atoms, and even more preferably an alkoxy group having 1 to 4 carbon atoms. Examples of the alkoxy group include a methoxy group, an ethoxy group, an n-propoxy group, an i-propoxy group, an n-butoxy group, an i-butoxy group, an s-butoxy group, a t-butoxy group, an n-octyloxy group, and a 2-methoxyethoxy group, and particularly preferred is a methoxy group. The alkoxy group may have a substituent. The substituent will be described below.

The substituted or unsubstituted amino group in the case in which $W_1$ and $W_2$ each represent a substituted or unsubstituted amino group is preferably an amino group, an alkylamino group, an arylamino group, or a heterocyclic amino group; more preferably an amino group, an alkylamino group having 1 to 30 carbon atoms, or an anilino group having 6 to 30 carbon atoms; even more preferably an amino group, an alkylamino group having 1 to 8 carbon atoms, or an anilino group having 6 to 18 carbon atoms; and particularly preferably an amino group, an alkylamino group having 1 to 4 carbon atoms, or an anilino group having 6 to 12 carbon atoms. Examples of the substituted or unsubstituted amino group include an amino group ($-NH_2$), a methylamino group ($-NHCH_3$), a dimethylamino group $\{-N(CH_3)_2\}$, an anilino group ($-NHPh$), an N-methylanilino group $\{-N(CH_3)Ph\}$, and a diphenylamino group $\{-N(Ph)_2\}$, and particularly preferred is an amino group. Ph represents a phenyl group. The substituent which may be carried by an amino group will be described in more detail below.

The aryl group in the case in which $W_1$ and $W_2$ each represent a substituted or unsubstituted aryl group is preferably an aryl group having 6 to 30 carbon atoms, more preferably an aryl group having 6 to 18 carbon atoms, and even more preferably an aryl group having 6 to 12 carbon atoms. Examples of the substituted or unsubstituted aryl group include a phenyl group, a p-tolyl group, a naphthyl group, an m-chlorophenyl group, and an o-hexadecanoylaminophenyl group. The substituent which may be carried by the aryl group will be described in more detail below.

It is preferable that $W_1$ and $W_2$ each independently represent a substituted or unsubstituted alkoxy group, a substituted or unsubstituted amino group, or a substituted or unsubstituted alkyl group; more preferably a substituted or unsubstituted alkoxy group or a substituted or unsubstituted amino group; even more preferably an alkoxy group having 5 or fewer carbon atoms in total, an amino group ($-NH_2$ group), or an alkylamino group having 5 or fewer carbon atoms in total; particularly preferably an alkoxy group having 3 or fewer carbon atoms in total or an alkylamino group having 3 or fewer carbon atoms in total; and most preferably a methoxy group.

In General Formula (1), $R_{11}$ and $R_{12}$ each independently represent a hydrogen atom or a substituent.

Examples of the substituent in the case in which $R_{11}$ and $R_{12}$ each represent a substituent include a substituted or unsubstituted alkyl group (for example, a substituted or unsubstituted, linear or branched alkyl group having 1 to 12 carbon atoms (for example, methyl, ethyl, n-propyl, i-propyl, n-butyl, i-butyl, sec-butyl, t-butyl, 2-ethylhexyl, 2-methylsulfonylethyl, 3-phenoxypropyl, or trifluoromethyl), a substituted or unsubstituted aralkyl group having 7 to 18 carbon atoms, a substituted or unsubstituted, linear or branched alkenyl group having 2 to 12 carbon atoms, a substituted or unsubstituted, linear or branched alkynyl group having 2 to 12 carbon atoms, a substituted or unsubstituted cycloalkyl group having 3 to 12 carbon atoms (for example, cyclopentyl), a substituted or unsubstituted cycloalkenyl group having 3 to 12 carbon atoms, a halogen atom (for example, a chlorine atom or a bromine atom), a substituted or unsubstituted aryl group (for example, phenyl, 4-t-butylphenyl, or 2,4-di-t-amylphenyl), a substituted or unsubstituted heterocyclic group (for example, imidazolyl, pyrazolyl, triazolyl, 2-furyl, 2-thienyl, 2-pyrimidinyl, or 2-benzothiazolyl), a cyano group, a hydroxyl group, a nitro group, a carboxy group, a substituted or unsubstituted amino group, a substituted or unsubstituted alkyloxy group (for example, methoxy, ethoxy, 2-methoxyethoxy, or 2-methylsulfonylethoxy), a substituted or unsubstituted aryloxy group (for example, phenoxy, 2-methylphenoxy, 4-t-butylphenoxy, 3-nitrophenoxy, 3-t-butyloxycarbonylphenoxy, or 3-methoxycarbonylphenyloxy), a substituted or unsubstituted amylamino group (for example, acetamide, benzamide, or 4-(3-t-butyl-4-hydroxyphenoxy)butanamide), a substituted or unsubstituted alkylamino group (for example, methylamino, butylamino, diethylamino, or methylbutylamino), a substituted or unsubstituted arylamino group (for example, phenylamino or 2-chloroanilino), a substituted or unsubstituted ureido group (for example, phenylureido, methylureido, or N,N-dibutylureido), a substituted or unsubstituted sulfamoylamino group (for example, N,N-dipropylsulfamoylamino), a substituted or unsubstituted alkylthio group (for example, methylthio, octylthio, or 2-phenoxyethylthio), a substituted or unsubstituted arylthio group (for example, phenylthio, 2-butoxy-5-t-octylphenylthio, or 2-carboxyphenylthio), a substituted or unsubstituted alkyloxycarbonylamino group (for example, methoxycarbonylamino), a substituted or unsubstituted alkylsulfonylamino group and arylsulfonylamino group (for example, methylsulfonylamino, phenylsulfonylamino, or p-toluenesulfonylamino), a substituted or unsubstituted carbamoyl group (for example, N-ethylcarbamoyl or N,N-dibutylcarbamoyl), a substituted or unsubstituted sulfamoyl group (for example, N-ethylsulfamoyl, N,N-dipropylsulfamoyl, or N-phenylsulfamoyl), a substituted sulfonyl group (for example, methylsulfonyl, octylsulfonyl, phenylsulfonyl, or p-toluenesulfonyl), a substituted or unsubstituted alkyloxycarbonyl group (for example, methoxycarbonyl or butyloxycarbonyl), a substituted or unsubstituted heterocyclic oxy group (for example, 1-phenyltetrazol-5-oxy or 2-tetrahydropyranyloxy), a substituted azo group (for example, phenylazo, 4-methoxyphenylazo, 4-pivaloylaminophenylazo, or 2-hydroxy-4-propanoylphenylazo), a substituted or unsubstituted acyloxy group (for example, an acetoxy group), a substituted or unsubstituted carbamoyloxy group (for example, N-methylcarbamoyloxy or N-phenylcarbamoyloxy), a substituted or unsubstituted silyloxy group (for example, trimethylsilyloxy or dibutylmethylsilyloxy), a substituted or unsubstituted aryloxycarbonylamino group (for example, phenoxycarbonylamino), a substituted imide group (for example, N-succinimide or N-phthalimide), a substituted or unsubstituted heterocyclic thio group (for example, 2-benzothiazolylthio, 2,4-di-phenoxy-1,3,5-triazole-6-thio, or 2-pyridylthio), a substituted or unsubstituted sulfinyl group (for example, 3-phenoxypropylsulfinyl), a substituted or unsubstituted phosphonyl group (for example, phenoxyphosphonyl, octyloxyphosphonyl, or phenylphosphonyl), a substituted or unsubstituted aryloxycarbonyl group (for example, phenoxycarbonyl), a substituted or unsubstituted acyl group (for example, acetyl, 3-phenylpropanoyl, or benzoyl), and an ionic hydrophilic group (for example, a carboxyl group, a sulfo group, a phosphono group, or a quaternary ammonium group).

It is preferable that $R_{11}$ and $R_{12}$ each independently represent a substituted or unsubstituted acylamino group having 1 to 8 carbon atoms in total, a substituted or unsubstituted alkyl group having 1 to 12 carbon atoms in total, a substituted or unsubstituted aryl group having 6 to 18 carbon atoms in total, or a substituted or unsubstituted heterocyclic group having 4 to 12 carbon atoms in total; and more preferably a linear or branched alkyl group having 1 to 8 carbon atoms in total, or a substituted or unsubstituted aryl group having 6 to 18 carbon atoms in total. A linear or branched alkyl group having 1 to 8 carbon atoms in total is preferred. Specifically, a methyl group, an i-propyl group, or a t-butyl group is preferred, an i-propyl group or a t-butyl group is particularly preferred, and a t-butyl group is most preferred.

In General Formula (1). Z represents a 5-membered heterocyclic ring or a 6-membered heterocyclic ring, both of which may have a substituent. Preferably, Z is a 6-membered nitrogen-containing heterocyclic ring having 3 to 10 carbon atoms. Two substituents may be bonded to each other and form a fused ring. The substituent will be described below.

Examples of the 5-membered heterocyclic ring or 6-membered heterocyclic ring represented by Z include a pyridine ring, a pyrazine ring, a pyridazine ring, a pyrimidine ring, a triazine ring, a pyrroline ring, a furan ring, a thiophene ring, a pyrazole ring, an imidazole ring, a triazole ring, an oxazole ring, a thiazole ring, an isothiazole ring, a thiadiazole ring, an isoxazole ring, a pyrrolidine ring, a piperidine ring, a piperazine ring, an imidazolidine ring, and a thiazoline ring. Examples of the fused ring formed by two substituents of the 5-membered heterocyclic ring or 6-membered heterocyclic ring bonded to each other include a quinoline ring, an isoquinoline ring, a cinnoline ring, a phthalazine ring, a quinoxaline ring, an indole ring, a benzofuran ring, a benzothiophene ring, a benzimidazole ring, a benzoxazole ring, a benzothiazole ring, a benzisothiazole ring, and a benzisoxazole ring.

Z is preferably a pyridine ring, a pyrimidine ring, an S-triazine ring, a pyridazine ring, a pyrazine ring, a 1,2,4-thiadiazole ring, a 1,3,4-thiadiazole ring, or an imidazole ring; and more preferably a pyridine ring, a pyrimidine ring, an S-triazine ring, a pyridazine ring, or a pyrazine ring. Particularly, from the viewpoints of hue, tinctorial power, and image fastness, a pyrimidine ring or an S-triazine ring is preferred, and a pyrimidine ring or an S-triazine ring having an alkoxy group having 1 to 4 carbon atoms at the 2-position is preferred from the viewpoints of hue and image fastness. Particularly, an S-triazine ring having an alkoxy group having 1 to 4 carbon atoms at the 2-position is most preferred from the viewpoint of enhancing satisfactory light fastness of images.

In General Formula (1), $G_1$ and $G_2$ each independently represent a hydrogen atom, a substituted or unsubstituted alkyl group (preferably having 1 to 20 carbon atoms), a substituted or unsubstituted aralkyl group (preferably having 7 to 20 carbon atoms), a substituted or unsubstituted alkenyl group (preferably having 2 to 20 carbon atoms), a substituted or unsubstituted alkynyl group (preferably having 2 to 20 carbon atoms), a substituted or unsubstituted aryl group (preferably having 2 to 20 carbon atoms), or a substituted or unsubstituted heterocyclic group (preferably having 1 to 20 carbon atoms).

It is preferable that $G_1$ and $G_2$ each represent a hydrogen atom, a methyl group, an ethyl group, an n-propyl group, an i-propyl group, an n-butyl group, an i-butyl group, a sec-butyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group; more preferably a hydrogen atom, a methyl group, a phenyl group, a pyridyl group, a pyrimidinyl group, or a pyrazinyl group. It is even more preferable that $G_1$ and $G_2$ each represent a linear or branched alkyl group having 1 to 8 carbon atoms in total, a 2-pyridyl group, a 2,6-pyrimidinyl group, a 2,5-pyrazinyl group, or a phenyl group, and an alkyl group having 3 or fewer carbon atoms in total is more preferred. Furthermore, from the viewpoints of hue and image fastness, a hydrogen atom, a methyl group, or a phenyl group is preferred, and above all, a methyl group is particularly preferred from the viewpoint of enhancing the hue and light fastness.

In General Formula (1), $Y_1$ and $Y_2$ each independently represent a hydrogen atom or a substituent.

Examples of the substituent in the case in which $Y_1$ and $Y_2$ each represent a substituent include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, an alkyl- or arylsulfinyl group, an alkyl- or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, and a silyl group.

Particularly preferred examples of $Y_1$ and $Y_2$ include a hydrogen atom, an alkyl group (for example, a methyl group), an aryl group (for example, a phenyl group), a heterocyclic group (for example, a 2-pyridyl group), and an alkylthio group (for example, a methylthio group). $Y_1$ and $Y_2$ are each more preferably a hydrogen atom, a linear or branched alkyl group having 1 to 4 carbon atoms in total, a phenyl group, or a methylthio group. From the viewpoint of hue and image fastness, a hydrogen atom or a methyl group is preferred, and above all, from the viewpoint of enhancing the hue and light fastness, a hydrogen atom is particularly preferred.

In General Formula (1), examples of the substituent in the case in which $G_1$, $G_2$, $Y_1$, $Y_2$, $W_1$, $W_2$, $R_{11}$, $R_{12}$, or Z further has a substituent include the following substituents (hereinafter, may be referred to as "substituent J").

(Substituent J)

Examples of the substituent J include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxvycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, an alkyl- or arylsulfinyl group, an alkyl- or arylsulfonyl group, an acyl group, an aryloxycarbonyl group, an alkoxycarbonyl group, a carbamoyl group, an aryl- or heterocyclic azo group, an imide group, a phosphino group, a phosphinyl group, a phosphinyloxy group, a phosphinylamino group, and a silyl group.

More particularly, examples of the halogen atom include a fluorine atom, a chlorine atom, a bromine atom, and an iodine atom.

The alkyl group may be a linear, branched or cyclic, substituted or unsubstituted alkyl group, and this also includes a cycloalkyl group, a bicycloalkyl group, a tricyclo structure having more ring structures, and the like. Particularly, the alkyl group is preferably an alkyl group having 1 to 30 carbon atoms, and examples thereof include a methyl group, an ethyl group, an n-propyl group, an isopropyl group, a t-butyl group, an n-octyl group, an eicosyl group, a 2-chloroethyl group, a 2-cyanoethyl group, and a 2-ethylhexyl group. The cycloalkyl group is preferably a substituted or unsubstituted cycloalkyl group having 3 to 30 carbon atoms, and examples thereof include a cyclohexyl group, a cyclopentyl group, and a 4-n-dodecylcyclohexyl group. The bicycloalkyl group is preferably a substituted or unsubstituted bicycloalkyl group having 5 to 30 carbon atoms, that is, a monovalent group obtained by removing one hydrogen atom from a bicycloalkane having 5 to 30 carbon atoms. Examples thereof include a bicyclo[1,2,2]heptan-2-yl group and a bicyclo[2,2,2]octan-3-yl group.

The aralkyl group may be a substituted or unsubstituted aralkyl group, and the substituted or unsubstituted aralkyl group is preferably an aralkyl group having 7 to 30 carbon atoms. Examples thereof include a benzyl group and a 2-phenethyl group.

The alkenyl group may be a linear, branched or cyclic, substituted or unsubstituted alkenyl group and includes a cycloalkenyl group and a bicycloalkenyl group. Particularly, the alkenyl group is preferably a substituted or unsubstituted alkenyl group having 2 to 30 carbon atoms, and examples include a vinyl group, an allyl group, a prenyl group, a geranyl group, and an oleyl group. The cycloalkenyl group is preferably a substituted or unsubstituted cycloalkenyl group having 3 to 30 carbon atoms, that is, a monovalent group obtained by removing one hydrogen atom from a cycloalkene having 3 to 30 carbon atoms, and examples include a 2-cyclopenten-1-yl group and a 2-cyclohexen-1-yl group. The bicycloalkenyl group is a substituted or unsubstituted bicycloalkenyl group, and preferably a substituted or unsubstituted bicycloalkenyl group having 5 to 30 carbon atoms, that is, a monovalent group obtained by removing one hydrogen atom from a bicycloalkene having one double bond. Examples thereof include a bicyclo[2,2,1]hept-2-en-1-yl group and a bicyclo[2,2,2]oct-2-en-4-yl group.

The alkynyl group is preferably a substituted or unsubstituted alkynyl group having 2 to 30 carbon atoms, and examples include an ethynyl group, a propargyl group, and a trimethylsilylethynyl group.

The aryl group is preferably a substituted or unsubstituted aryl group having 6 to 30 carbon atoms, and examples include a phenyl group, a p-tolyl group, a naphthyl group, an m-chlorophenyl group, and an o-hexadecanoylaminophenyl group.

The heterocyclic group is preferably a monovalent group obtained by removing one hydrogen atom from a 5-membered or 6-membered, substituted or unsubstituted, aromatic or non-aromatic heterocyclic compound, and more preferably a 5-membered or 6-membered aromatic heterocyclic group having 3 to 30 carbon atoms. Examples include a 2-furyl group, a 2-thienyl group, a 2-pyrimidinyl group, and a 2-benzothiazolyl group.

The alkoxy group is preferably a substituted or unsubstituted alkoxy group having 1 to 30 carbon atoms, and examples include a methoxy group, an ethoxy group, an isopropoxy group, a t-butoxy group, an n-octyloxy group, and a 2-methoxyethoxy group.

The aryloxy group is preferably a substituted or unsubstituted aryloxy group having 6 to 30 carbon atoms, and examples include a phenoxy group, a 2-methylphenoxy group, a 4-t-butylphenoxy group, a 3-nitrophenoxy group, and a 2-tetradecanoylaminophenoxy group.

The silyloxy group is preferably a substituted or unsubstituted silyloxy group having 0 to 20 carbon atoms, and examples include a trimethylsilyloxy group and a diphenylmethylsilyloxy group.

The heterocyclic oxy group is preferably a substituted or unsubstituted heterocyclic oxy group having 2 to 30 carbon atoms, and examples include a 1-phenyltetrazol-5-oxy group and a 2-tetrahydropyranyloxy group.

The acyloxy group is preferably a formyloxy group, a substituted or unsubstituted alkylcarbonyloxy group having 2 to 30 carbon atoms, or a substituted or unsubstituted arylcarbonyloxy group having 6 to 30 carbon atoms, and examples include an acetyloxy group, a pivaloyloxy group, a stearoyloxy group, a benzoyloxy group, and a p-methoxyphenylcarbonyloxy group.

The carbamoyloxy group is preferably a substituted or unsubstituted carbamoyloxy group having 1 to 30 carbon atoms, and examples include an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group.

The alkoxycarbonyloxy group is preferably a substituted or unsubstituted alkoxycarbonyloxy group having 2 to 30 carbon atoms, and examples include a methoxycarbonyloxy group, an ethoxycarbonyloxy group, a t-butoxycarbonyloxy group, and an n-octylcarbonyloxy group.

The aryloxycarbonyloxy group is preferably a substituted or unsubstituted aryloxycarbonyloxy group having 7 to 30 carbon atoms, and examples include a phenoxycarbonyloxy group, a p-methoxyphenoxycarbonyloxy group, and a p-n-hexadecyloxyphenoxycarbonyloxy group.

The amino group includes an alkylamino group, an arylamino group, and a heterocyclic amino group, and the amino group is preferably an amino group, a substituted or unsubstituted alkylamino group having 1 to 30 carbon atoms, or a substituted or unsubstituted anilino group having 6 to 30 carbon atoms. Examples include a methylamino group, a dimethylamino group, an anilino group, an N-methyl-anilino group, and a diphenylamino group.

The acylamino group is preferably a formylamino group, a substituted or unsubstituted alkylcarbonylamino group having 1 to 30 carbon atoms, or a substituted or unsubstituted arylcarbonylamino group having 6 to 30 carbon atoms. Examples include an acetylamino group, a pivaloylamino group, a lauroylamino group, a benzoylamino group, and a 3,4,5-tri-n-octyloxyphenylcarbonylamino group.

The aminocarbonylamino group is preferably a substituted or unsubstituted aminocarbonylamino group having 1 to 30 carbon atoms, and examples include a carbamoylamino group, an N,N-dimethylaminocarbonylamino group, an N,N-diethylaminocarbonylamino group, and a morpholinocarbonylamino group.

The alkoxycarbonylamino group is preferably a substituted or unsubstituted alkoxycarbonylamino group having 2 to 30 carbon atoms, and examples include a methoxycarbonylamino group, an ethoxycarbonylamino group, a t-butoxycarbonylamino group, an n-octadecyloxycarbonylamino group, and an N-methyl-methoxycarbonylamino group.

The aryloxycarbonylamino group is preferably a substituted or unsubstituted aryloxycarbonylamino group having 7 to 30 carbon atoms, and examples include a phenoxycarbonylamino group, a p-chlorophenoxycarbonylamino group, and an m-n-octyloxyphenoxycarbonylamino group.

The sulfamoylamino group is preferably a substituted or unsubstituted sulfamoylamino group having 0 to 30 carbon atoms, and examples include a sulfamoylamino group, an N,N-dimethylaminosulfonylamino group, and an N-n-octylaminosulfonylamino group.

The alkyl- or arylsulfonylamino group is preferably a substituted or unsubstituted alkylsulfonylamino group having 1 to 30 carbon atoms, or a substituted or unsubstituted arylsulfonylamino group having 6 to 30 carbon atoms. Examples include a methylsulfonylamino group, a butylsulfonylamino group, a phenylsulfonylamino group, a 2,3,5-trichlorophenylsulfonylamino group, and a p-methylphenylsulfonylamino group.

The alkylthio group is preferably a substituted or unsubstituted alkylthio group having 1 to 30 carbon atoms, and examples include a methylthio group, an ethylthio group, and an n-hexadecylthio group.

The arylthio group is preferably a substituted or unsubstituted arylthio group having 6 to 30 carbon atoms, and examples include a phenylthio group, a p-chlorophenylthio group, and an m-methoxyphenylthio group.

The heterocyclic thio group is preferably a substituted or unsubstituted heterocyclic thio group having 2 to 30 carbon atoms, and examples include a 2-benzothiazolylthio group and a 1-phenyltetrazol-5-ylthio group.

The sulfamoyl group is preferably a substituted or unsubstituted sulfamoyl group having 0 to 30 carbon atoms, and examples include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group.

The alkyl- or arylsulfinyl group is preferably a substituted or unsubstituted alkylsulfinyl group having 1 to 30 carbon atoms, or a substituted or unsubstituted arylsulfinyl group having 6 to 30 carbon atoms. Examples include a methylsulfinyl group, an ethylsulfinyl group, a phenylsulfinyl group, and a p-methylphenylsulfinyl group.

The alkyl- or arylsulfonyl group is preferably a substituted or unsubstituted alkylsulfonyl group having 1 to 30 carbon atoms, or a substituted or unsubstituted arylsulfonyl group having 6 to 30 carbon atoms. Examples include a methylsulfonyl group, an ethylsulfonyl group, a phenylsulfonyl group, and a p-methylphenylsulfonyl group.

The acyl group is preferably a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 2 to 30 carbon atoms, which is bonded to a carbonyl group with a carbon atom. Examples include an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group.

The aryloxycarbonyl group is preferably a substituted or unsubstituted aryloxycarbonyl group having 7 to 30 carbon atoms, and examples include a phenoxycarbonyl group, an o-chlorophenoxycarbonyl group, an m-nitrophenoxycarbonyl group, and a p-t-butylphenoxycarbonyl group.

The alkoxycarbonyl group is preferably a substituted or unsubstituted alkoxycarbonyl group having 2 to 30 carbon atoms, and examples include a methoxycarbonyl group, an ethoxycarbonyl group, a t-butoxycarbonyl group, and an n-octadecyloxycarbonyl group.

The carbamoyl group is preferably a substituted or unsubstituted carbamoyl group having 1 to 30 carbon atoms, and examples include a carbamoyl group, an N-methylcarbamoyl group, an N,N-dimethylcarbamoyl group, an N,N-di-n-octylcarbamoyl group, and an N-(methylsulfonyl)carbamoyl group.

The aryl or heterocyclic azo group is preferably a substituted or unsubstituted arylazo group having 6 to 30 carbon atoms, or a substituted or unsubstituted heterocyclic azo group having 3 to 30 carbon atoms. Examples include a phenylazo group, a p-chlorophenylazo group, and a 5-ethylthio-1,3,4-thiadiazol-2-ylazo group.

The imide group is preferably an N-succinimide group or an N-phthalimide group.

The phosphino group is preferably a substituted or unsubstituted phosphino group having 0 to 30 carbon atoms, and examples include a dimethylphosphino group, a diphenylphosphino group, and a methylphenoxyphosphino group.

The phosphinyl group is preferably a substituted or unsubstituted phosphinyl group having 0 to 30 carbon atoms, and examples include a phosphinyl group, a dioctyloxyphosphinyl group, and a diethoxyphosphinyl group.

The phosphinyloxy group is preferably a substituted or unsubstituted phosphinyloxy group having 0 to 30 carbon atoms, and examples include a diphenoxyphosphinyloxy group and a dioctyloxyphosphinyloxy group.

The phosphinylamino group is preferably a substituted or unsubstituted phosphinylamino group having 0 to 30 carbon atoms, and examples include a dimethoxyphosphinylamino group and a dimethylaminophosphinylamino group.

The silyl group is preferably a substituted or unsubstituted silyl group having 0 to 30 carbon atoms, and examples include a trimethylsilyl group, a t-butyldimethylsilyl group, and a phenyldimethylsilyl group.

Among the above-described substituents, a substituent having hydrogen atoms may have the hydrogen atoms substituted by the above-described substituents. Examples of such a substituent include an alkylcarbonylaminosulfonyl group, an arylcarbonylaminosulfonyl group, an alkylsulfonylaminocarbonyl group, and an arylsulfonylaminocarbonyl group. Examples thereof include a methylsulfonylaminocarbonyl group, a p-methylphenylsulfonylaminocarbonyl group, an acetylaminosulfonyl group, and a benzoylaminosulfonyl group.

Regarding specific examples of the compound represented by General Formula (1), the compounds described in paragraphs [0124] to [0139] of JP2011-074376A may be referred to.

The pigment according to the invention is preferably a pigment including at least one of a compound represented by Formula (d1), Formula (d2), or Formula (d3), a tautomer thereof, or a salt of the compound or the tautomer; and more preferably a pigment including at least one of a compound represented by Formula (d1), a tautomer thereof, or a salt of the compound or the tautomer.

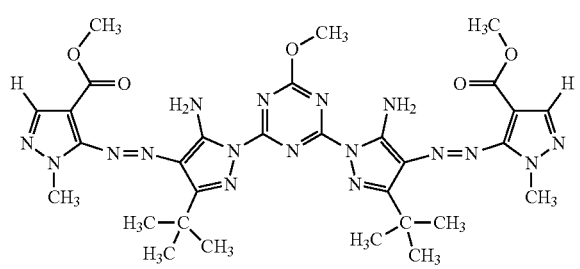

(d1)

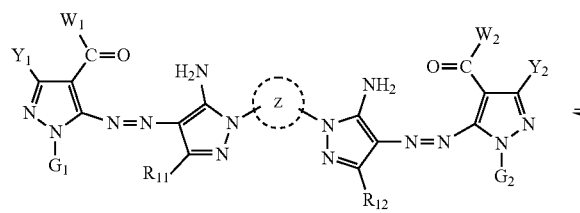

(1)

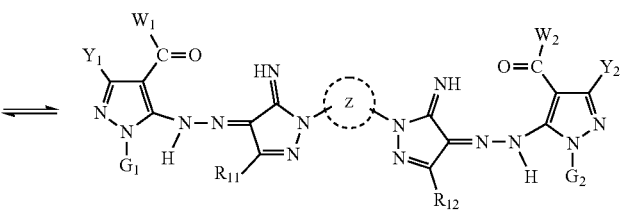

(1')

-continued

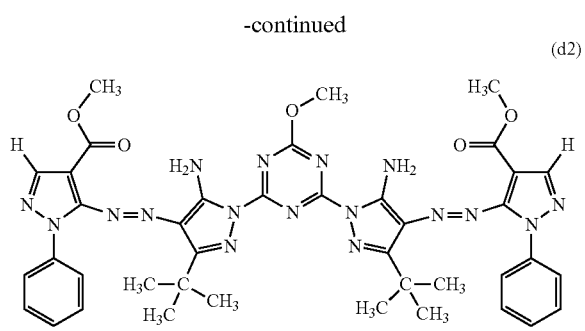

(d2)

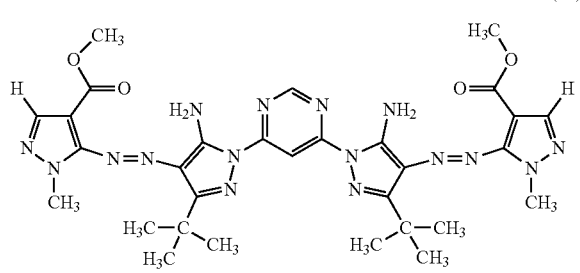

(d3)

In a case in which the pigment used for the invention has crystal polymorphs, the pigment may be any one of the polymorphs, or may be a mixture of two or more kinds of polymorphs; however, it is preferable that the pigment includes a compound having a single crystal form as a main component. That is, it is preferable that crystal polymorphs are not incorporated, and the content of the pigment having a single crystal form is 70% to 100%, preferably 80%6 to 100%, more preferably 90% to 100%, even more preferably 95% to 100%, and particularly preferably 100%, with respect to the total amount of the pigment.

The pigment used for the invention may include a tautomer of the compound represented by General Formula (1).

General Formula (1) represents a form of extreme structural formula among various types of tautomers that can be adopted in view of the chemical structure; however, the tautomer may be a tautomer other than the described structure, or a mixture including a plurality of tautomers may also be used.

For example, regarding the compound represented by General Formula (1), a tautomer of azo-hydrazone represented by General Formula (1') may be considered.

In General Formula (1'), $R_{11}$, $R_{12}$, $W_1$, $W_2$, $Y_1$, $Y_2$, $G_1$, $G_2$, and Z have the same meanings as $R_{11}$, $R_{12}$, $W_1$, $W_2$, $Y_1$, $Y_2$, $G_1$, $G_2$, and Z of General Formula (1), respectively.

The compound represented by General Formula (1) may be such that, in a case in which the compound has acid groups, a portion or the entirety of the acid groups may be of salt type, or salt type compounds and free acid type compounds may exist as a mixture. Examples of the salt type compound include salts of alkali metals such as Na, Li, and K; salts of alkaline earth metals such as Mg, Ca, and Ba; salts of ammonium which may be substituted with an alkyl group or a hydroxyalkyl group; and salts of organic amines. Examples of the organic amines include lower alkylamines, hydroxy-substituted lower alkylamines, carboxy-substituted lower alkylamines, and polyamines having 2 to 10 alkyleneimine units each having 2 to 4 carbon atoms. In the case of these salt type compounds, the kind of the compounds is not limited to a single kind, and a plurality of kinds of compounds may exist as a mixture.

In regard to the compound represented by General Formula (1), in a case in which a plurality of acid groups is included in one molecule, the plurality of acid groups may be of salt type or free acid type, and may be different from one another.

The pigment used for the invention may be a hydrate containing water molecules in the crystal.

The pigment used for the invention is a pigment including a compound represented by General Formula (1), a tautomer thereof, or a salt of the compound or the tautomer, and aggregates of molecules of the compound represented by General Formula (1), a tautomer thereof, or a salt of the compound or the tautomer are in the form of fine particles. The percentage content of the compound represented by General Formula (1), a tautomer thereof, or a salt of the compound or the tautomer in the pigment is preferably 80% by mass or more.

Regarding the method for synthesizing the compound represented by General Formula (1) used for the invention, and the method for producing a pigment (including posttreatments such as solvent salt milling), the description of paragraphs [0153] to [0159] of JP2011-074376A can be referred to.

The content of the pigment in the pigment dispersion liquid according to the embodiment of the invention is preferably 0.1% to 50% by mass, and more preferably 1% to 30% by mass, with respect to the total amount of the pigment dispersion liquid.

(Polymer Dispersant)

The polymer dispersant included in the pigment dispersion liquid according to the embodiment of the invention includes a polymer compound having a repeating unit represented by General Formula (2-1) and a repeating unit represented by General Formula (2-2), and having a structure represented by General Formula (3) introduced into at least one terminal of the main chain.

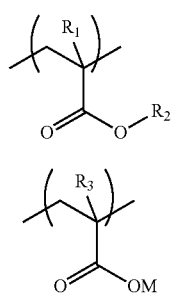

In General Formula (2-1), $R_1$ represents a hydrogen atom, a methyl group, or a substituted methyl group; and $R_2$ represents a substituted or unsubstituted alkyl group, a substituted or unsubstituted aralkyl group, or a substituted or unsubstituted aryl group.

In General Formula (2-2), $R_3$ represents a hydrogen atom, a methyl group, or a substituted methyl group; and M represents a hydrogen atom or a counter cation.

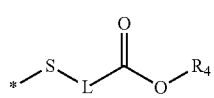

In General Formula (3), L represents a linking group; $R_4$ represents a substituted or unsubstituted alkyl group, a substituted or unsubstituted aryl group, or a substituted or unsubstituted heterocyclic group; and the symbol * represents a linking bond.

In General Formula (2-1) described above, $R_1$ represents a hydrogen atom, a methyl group, or a substituted methyl group. $R_1$ is preferably a hydrogen atom or a methyl group, and more preferably a methyl group. Examples of the substituent that is carried by the substituted methyl group include the above-mentioned substituent J.

In General Formula (2-1), $R_2$ represents a substituted or unsubstituted alkyl group, a substituted or unsubstituted aralkyl group, or a substituted or unsubstituted aryl group.

The substituted or unsubstituted alkyl group is preferably a substituted or unsubstituted alkyl group having 1 to 30 carbon atoms, and more preferably a substituted or unsubstituted alkyl group having 1 to 20 carbon atoms. Specifically, it is preferable that the substituted or unsubstituted alkyl group is a methyl group, an ethyl group, an n-propyl group, an i-propyl group, a t-butyl group, an n-octyl group, a 2-ethylhexyl group, or a 2-phenoxyethyl group.

The substituted or unsubstituted aralkyl group is preferably a substituted or unsubstituted aralkyl group having 7 to 30 carbon atoms, and more preferably a substituted or unsubstituted aralkyl group having 7 to 20 carbon atoms. Specifically, it is preferable that the substituted or unsubstituted aralkyl group is a benzyl group or a 2-phenethyl group.

The substituted or unsubstituted aryl group is preferably a substituted or unsubstituted aryl group having 6 to 30 carbon atoms, and more preferably a substituted or unsubstituted aryl group having 6 to 20 carbon atoms. Specifically, it is preferable that the substituted or unsubstituted aryl group is a phenyl group, a p-tolyl group, or a naphthyl group.

Examples of the substituent in the case in which the alkyl group, the aralkyl group, and the aryl group each have a substituent include the above-mentioned substituent J.

$R_2$ is preferably a benzyl group, a methyl group, a 2-ethylhexyl group, or a 2-phenoxyethyl group, and more preferably a benzyl group.

In General Formula (2-2), $R_3$ represents a hydrogen atom, a methyl group, or a substituted methyl group. $R_3$ is preferably a hydrogen atom or a methyl group, and more preferably a methyl group. Examples of the substituent that is carried by the substituted methyl group include the above-mentioned substituent J.

In General Formula (2-2), M represents a hydrogen atom or a counter cation. In a case in which M represents a counter cation, examples of the counter cation include alkali metal ions such as sodium ion, lithium ion, and potassium ion; and organic cations such as ammonium ion and quaternary ammonium cation. Examples of the organic cations include lower alkylammonium cation, hydroxy-substituted lower alkylammonium cation, carboxy-substituted lower alkylammonium cation, and an organic cation having 2 to 10 alkyleneimine units each having 2 to 4 carbon atoms.

Regarding M in General Formula (2-2), all of them may be hydrogen atoms, all of them may be counter cations, or a portion of them may be hydrogen atoms, while a portion of them are counter cations. In a case in which hydrogen atoms and counter cations exist as a mixture, from the viewpoint of solubility in water, the ratio of hydrogen atoms and counter cations (molar ratio of hydrogen atoms/counter cations) is preferably 70/30 to 0/100. Furthermore, the counter cations may be of one kind, or two or more kinds thereof may exist as a mixture.

Next, General Formula (3) will be explained.

Examples of the linking group represented by L in General Formula (3) include a substituted or unsubstituted alkylene group, a substituted or unsubstituted arylene group, and a substituted or unsubstituted divalent heterocyclic group. The linking group is preferably a substituted or unsubstituted alkylene group, a substituted or unsubstituted arylene group, or a substituted or unsubstituted divalent heterocyclic group; and more preferably a substituted or unsubstituted alkylene group.

The substituted or unsubstituted alkylene group is preferably a substituted or unsubstituted alkylene group having 1 to 10 carbon atoms, and more preferably a substituted or unsubstituted alkylene group having 1 to 5 carbon atoms. Specific examples include a methylene group, an ethylene group, an n-propylene group, an i-propylene group, and a t-butylene group. It is more preferable that the substituted or unsubstituted alkylene group is a methylene group or an ethylene group.

The substituted or unsubstituted arylene group is preferably a substituted or unsubstituted arylene group having 6 to 30 carbon atoms, and specifically, the substituted or unsubstituted arylene group is preferably a phenylene group.

The substituted or unsubstituted divalent heterocyclic group is preferably a substituted or unsubstituted heterocyclic ring having 2 to 10 carbon atoms, and more preferably a 2-pyridyl group.

Examples of the substituent in the case in which the alkylene group, arylene group and divalent heterocyclic group each have a substituent include the above-mentioned substituent J.

In General Formula (3), $R_4$ represents a substituted or unsubstituted alkyl group, a substituted or unsubstituted aryl group, or a substituted or unsubstituted heterocyclic group.

$R_4$ is preferably a substituted or unsubstituted alkyl group, or a substituted or unsubstituted aryl group, and more preferably a substituted or unsubstituted alkyl group.

The substituted or unsubstituted alkyl group is preferably a substituted or unsubstituted alkyl group having 1 to 20 carbon atoms, and more preferably a substituted or unsubstituted alkyl group having 1 to 10 carbon atoms. Specifically, it is preferable that the substituted or unsubstituted alkyl group is a methyl group, an ethyl group, an n-propyl group, an i-propyl group, an n-butyl group, a t-butyl group, an n-octyl group, or a 2-ethylhexyl group, and more preferably a methyl group, an n-butyl group, an ethyl group, an i-propyl group, or a 2-ethylhexyl group. Furthermore, the alkyl group is preferably a linear or branched alkyl group.

The substituted or unsubstituted aryl group is preferably a substituted or unsubstituted aryl group having 6 to 30 carbon atoms, and specifically, the substituted or unsubstituted aryl group is preferably a phenyl group.

Examples of the substituent in the case in which the alkyl group, aryl group, and heterocyclic group each have a substituent include the above-mentioned substituent J.

The polymer dispersant has the repeating unit represented by General Formula (2-1) and the repeating unit represented by General Formula (2-2), and the content ratio (molar ratio) of the various monomer units included in one molecule of the polymer dispersant, which is represented by the expression: repeating unit represented by General Formula (2-1)/ repeating unit represented by General Formula (2-2), is preferably 50/50 to 90/10, and more preferably 60/40 to 80/20. In a case in which the content ratio is 50/50 or higher, since the amount of the repeating unit of General Formula (2-1) acting as an adsorbing group to pigment particles is sufficient, the adsorbability to the pigment is enhanced. In a case in which the content ratio is 90/10 or lower, the polymer dispersant acquires adequate solubility in water, and it is thought that the polymer dispersant can easily adsorb to the pigment in an aqueous system. As the adsorbability to the pigment is enhanced, continuous jetting properties are enhanced, and therefore, the above-described range is preferable.

Regarding the repeating unit represented by General Formula (2-1) and the repeating unit represented by General Formula (2-2) included in the polymer dispersant, a single kind of each of the repeating units may exist, or two or more kinds thereof may exist.

The acid value of the polymer dispersant is preferably from 1.6 mmol/g to 2.6 mmol/g, and more preferably from 1.7 mmol/g to 2.2 mmol/g. In a case in which the acid value of the polymer dispersant is 1.6 mmol/g or higher, the polymer dispersant acquires adequate solubility in water, easily adsorbs to the pigment, and makes the continuous jetting properties of the ink satisfactory. Therefore, it is preferable. In a case in which the acid value of the polymer dispersant is 2.6 mmol/g or lower, the affinity to a solvent does not become high, and the polymer dispersant can easily adsorb to the pigment. Therefore, the continuous jetting properties of the ink become satisfactory, which is preferable.

The acid value was measured by titrating the free form that exists before the addition of a counter cation, with a 0.1 mol/L aqueous solution of sodium hydroxide using an automatic titration apparatus, COM-2500 (manufactured by Hiranuma Sangyo Co., Ltd.).

In the polymer dispersant, at least one terminal of the main chain has a structure represented by General Formula (3) described above.

The structure represented by General Formula (3) can be introduced into at least one terminal of the main chain of the polymer compound by using, as will be described below, a chain transfer agent containing the structure represented by General Formula (3) described above at the time of synthesizing the polymer dispersant.

Regarding the polymer dispersant, one terminal of the main chain may have the structure represented by General Formula (3), or both terminals of the main chain may have the structure represented by General Formula (3).

In a case in which one terminal of the main chain has the structure represented by General Formula (3), the structure of the other terminal is not particularly limited; however, from the viewpoint of the adsorption power to the pigment, a structure having a carbonyl group is preferred. A structure having a carbonyl group can be introduced into one terminal of the main chain of the polymer compound by using, as will be described below, a polymerization initiator containing a structure having a carbonyl group at the time of synthesizing the polymer dispersant.

The polymer dispersant may further include another repeating unit. Examples of the other repeating unit include styrene and (meth)acrylamide. In a case in which the polymer dispersant includes another repeating unit, the content of the other repeating unit is preferably 0.1 mol % to 20 mol % with respect to all of the repeating units of the polymer dispersant.

The polymer dispersant used for the invention may be produced by any appropriate means; however, it is preferable to copolymerize the monomer represented by General Formula (2-1) and the monomer represented by General Formula (2-2) by free radical polymerization. Appropriate examples of free radical polymerization include, but are not particularly limited to, suspension polymerization, solution polymerization, dispersion polymerization, and emulsion polymerization; however, solution polymerization is preferred.

At the time of polymerization, a radical polymerization initiator can be used. Examples of the radical polymerization initiator include the radical polymerization initiators described in paragraphs [0135] to [0208] of JP2006-085049A. Examples include (a) an aromatic ketone, (b) an acylphosphine oxide compound, (c) an aromatic onium salt compound, (d) an organic peroxide, (e) a thio compound, (f) a hexaarylbiimidazole compound, (g) a keto oxime ester compound, (h) a borate compound, (i) an azo compound, (j) a metallocene compound, (k) an active ester compound, (l) a compound having a carbon-halogen bond. (m) an α-aminoketone compound, and (n) an alkylamine compound. Specific examples include peroxide ester-based compounds such as (2-ethylhexanoyl) (tert-butyl) peroxide, 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra (cumylperoxycarbonyl)benzophenone, 3,3',4,4'-tetra(p-isopropylcumylperoxycarbonyl)benzophenone, and di-t-butyl diperoxyisophthalate; and dimethyl-2,2'-azobis(2-methyl propionate). Particularly, a polymerization initiator having a carbonyl group in the molecular structure is preferable because in a case in which the polymerization initiator is introduced into one terminal of the main chain of the polymer dispersant during the polymerization reaction, the adsorption power of the polymer dispersant to the pigment becomes high. Regarding preferred polymerization initiators, commercially available products can also be used, and examples include "PERBUTYL O" (manufactured by NOF Corporation) and "V-601" (manufactured by Wako Pure Chemical Industries, Ltd.).

The amount of the radical polymerization initiator to be used is preferably 0.001 to 5 mol, and more preferably 0.01 to 2 mol, with respect to 1 mol of the monomers supplied to the polymerization.

Furthermore, at the time of polymerizing the polymer dispersant, it is preferable that a polymer dispersant in which at least one terminal of the main chain has the structure represented by General Formula (3) is produced using a chain transfer agent containing the structure represented by General Formula (3).

The chain transfer agent containing the structure represented by General Formula (3) may be a chain transfer agent represented by General Formula (3').

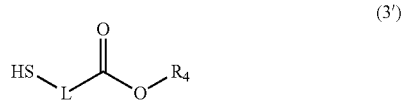

(3')

In General Formula (3'), L represents a linking group; and $R_4$ represents a substituted or unsubstituted alkyl group, a substituted or unsubstituted aryl group, or a substituted or unsubstituted heterocyclic group.

L and $R_4$ in General Formula (3') have the same meanings as L and $R_4$ in General Formula (3), respectively, and preferred examples are also similar.

Examples of the chain transfer agent represented by General Formula (3') include butyl 3-mercaptopropionate, 2-ethylhexyl 3-mercaptopropionate, methyl 3-mercaptopropionate, methyl thioglycolate, ethyl thioglycolate, butyl thioglycolate, 2-ethylhexyl thioglycolate, 3-methoxybutyl thioglycolate, and octyl thioglycolate. Butyl 3-mercaptopropionate, 2-ethylhexyl 3-mercaptopropionate, methyl 3-mercaptopropionate, methyl thioglycolate, and ethyl thioglycolate are more preferred.

The amount of the chain transfer agent to be used is preferably 0.0001 to 0.20 mol with respect to 1 mol of all of the monomers supplied to the polymerization, from the viewpoint of obtaining a pigment dispersion liquid and an inkjet ink, which have excellent jetting stability and glossiness, and from the viewpoint of enhancing the dispersion stability of the pigment. Furthermore, from the viewpoint of obtaining a pigment dispersion liquid and an inkjet ink, which have excellent water resistance, scratch resistance, jetting stability, and bleeding resistance, the amount of the chain transfer agent is preferably 0.001 to 0.10 mol, and more preferably 0.005 to 0.08 mol, with respect to 1 mol of all of the monomers supplied to the polymerization.

In regard to the polymerization of the polymer dispersant, usually, the polymerization temperature is preferably 50° C. to 150° C., and more preferably 60° C. to 120° C. The polymerization time is preferably 1 to 24 hours. The polymerization atmosphere is preferably an inert gas atmosphere of nitrogen gas, argon, or the like.

It is preferable that the polymerization reaction is carried out by adding dropwise a solution produced by adding a polymerization initiator, monomers that serve as raw materials, and a chain transfer agent to a polymerization solvent, into a reaction vessel, or the polymerization reaction is carried out by producing an initiator solution by adding a polymerization initiator to a polymerization solvent, producing a monomer solution by adding a chain transfer agent and monomers that serve as raw materials to a polymerization solvent, and adding dropwise and mixing the respective solutions into a reaction vessel containing a polymerization solvent.

After completion of the polymerization reaction, a polymer dispersant purified by known methods such as reprecipitation and solvent distillation can be isolated from the reaction solution. The polymer dispersant thus obtained can be purified by repeating reprecipitation and removing unreacted monomers and the like by membrane separation, chromatography, extraction, or the like.

Examples of the polymerization solvent include glycerin, ethylene glycol, diethylene glycol, triethylene glycol, polyethylene glycol, 1,3-propanediol, 1,4-butanediol, 1,2-hexanediol, hexylene glycol, diglycerol, dipropylene glycol, 2-pyrrolidone, triethylene glycol monobutyl ether, propylene glycol monomethyl ether acetate, and isopropanol.

According to the invention, it is one of preferred aspects to use at least one selected from glycerin, ethylene glycol, diethylene glycol, triethylene glycol, polyethylene glycol, 1,3-propanediol, 1,4-butanediol, 1,2-hexanediol, hexylene glycol, or diglycerol, as the polymerization solvent. Among the polymerization solvents described above, it is most preferable to use 1,2-hexanediol.

It is considered that wettability of the pigment by the solvent in the dispersion liquid is involved with the dispersibility of the pigment dispersion liquid, and it is speculated that 1,2-hexanediol has high affinity to the pigment according to the invention. Therefore, it is thought that in a case in which 1,2-hexanediol is used as the polymerization solvent for the polymer dispersant, dispersibility is enhanced.

The weight-average molecular weight (Mw) of the polymer dispersant is preferably 4,000 to 50,000, and more preferably 5,000 to 20,000. In a case in which the weight-average molecular weight of the polymer dispersant is 4,000 or more, the image quality of the printed material is excellent, which is preferable. In a case in which the weight-average molecular weight of the polymer dispersant is 50,000 or less, the viscosity of the pigment dispersion liquid and the inkjet ink can be prevented from increasing, and the drop velocity of the ink can be made fast, which is preferable. Furthermore, deterioration of the storage stability of the ink can be prevented, which is preferable.

The drop velocity of the ink tends to correlate with the viscosity of the ink, and the viscosity of the ink is closely related to the molecular weight of the polymer dispersant in the pigment dispersion liquid. Thus, it is considered that as the molecular weight of the polymer dispersant is lower, the viscosity becomes lower. Therefore, it is speculated that the viscosity of the ink can be suppressed to a low level by adjusting the weight-average molecular weight of the polymer dispersant to the above-described particular range, and the drop velocity can be made faster.

In the present specification, the weight-average molecular weight of the resin is a value measured by a gel permeation chromatography (GPC) method and calculated relative to polystyrene standards. Measurement by GPC was carried out using HLC-8220 (manufactured by Tosoh Corporation), using TSK gel GMHXL, TSK gel G4000HXL, and TSK gel G2000HXL (manufactured by Tosoh Corporation, 7.8 mm ID×30.0 cm) as the columns, and using tetrahydrofuran (THF) as an eluent.

The content of the polymer dispersant in the pigment dispersion liquid according to the embodiment of the invention is preferably in the range of 10 to 100 parts by mass, more preferably in the range of 20 to 80 parts by mass, and even more preferably in the range of 30 to 60 parts by mass, with respect to 100 parts by mass of the pigment.

In a case in which the content of the polymer dispersant is 10 parts by mass or more with respect to 100 parts by mass of the pigment, the pigment can be efficiently dispersed, which is preferable. Furthermore, in a case in which the content of the polymer dispersant is 100 parts by mass or less with respect to 100 parts by mass of the pigment, productivity is increased, and it is economically efficient, which is preferable.

The polymer dispersants may be used singly, or two or more kinds thereof may be used in combination.

(Water)

The pigment dispersion liquid according to the embodiment of the invention includes water.

Water may be tap water, water from a well, or the like, and there are no particular limitations. However, for example, pure water or ultrapure water, such as ion exchange water, ultrafiltration water, reverse osmosis water, or distilled water, is preferred. Furthermore, for the purpose of preventing the generation of fungi, bacteria, and the like, it is also preferable to use water that has been sterilized by an ultraviolet treatment, an aqueous hydrogen peroxide treatment, or the like.

The content of water in the pigment dispersion liquid is preferably 20% to 98% by mass, and more preferably 30% to 90% by mass, with respect to the total amount of the pigment dispersion liquid.

(Other Components)

The pigment dispersion liquid according to the embodiment of the invention may include other components in addition to the pigment, the polymer dispersant, and water. Examples of the other components include an organic solvent and a preservative.

(Organic Solvent)

Preferred examples of the organic solvent include an alcohol-based solvent, a ketone-based solvent, and an ether-based solvent, and any solvent having a solubility in water at 20° C. of 50% by mass or less and 10% by mass or more is preferred.

Examples of the alcohol-based solvent include ethanol, isopropanol, n-butanol, tertiary butanol, isobutanol, and diacetone alcohol. Examples of the ketone-based solvent include acetone, methyl ethyl ketone, diethyl ketone, and methyl isobutyl ketone. Examples of the ether-based solvent include dibutyl ether, tetrahydrofuran, and dioxane. Among these solvents, isopropanol, acetone, and methyl ethyl ketone are preferred, and particularly, methyl ethyl ketone is preferred. These solvents can be used singly or as mixtures of two or more kinds thereof.

It is also preferable that the polymerization solvent used at the time of synthesizing the polymer dispersant is included as the organic solvent. Specifically, the organic solvent is preferably at least one selected from glycerin, ethylene glycol, diethylene glycol, triethylene glycol, polyethylene glycol, 1,3-propanediol, 1,4-butanediol, 1,2-hexanediol, hexylene glycol, diglycerol, dipropylene glycol, 2-pyrrolidone, triethylene glycol monobutyl ether, propylene glycol monomethyl ether acetate, or isopropanol; particularly preferably at least one selected from glycerin, ethylene glycol, diethylene glycol, triethylene glycol, polyethylene glycol, 1,3-propanediol, 1,4-butanediol, 1,2-hexanediol, or diglycerol; and most preferably 1,2-hexanediol.

The content of the organic solvent in the pigment dispersion liquid is preferably 0.01% to 30% by mass.

(Preservative)

The pigment dispersion liquid according to the embodiment of the invention may include a preservative. A preservative means an agent having a function of preventing the occurrence and growth of microorganisms, particularly bacteria and fungi (molds).

Examples of the preservative include inorganic preservatives containing heavy metal ions (silver ion-containing substances and the like) and salts. Regarding the organic preservatives, various agents such as quaternary ammonium salts (tetrabutylammonium chloride, cetylpyridinium chloride, benzyltrimethylammonium chloride, and the like), phenolic derivatives (phenol, cresol, butylphenol, xylenol, bisphenol, and the like), phenoxy ether derivatives (phenoxyethanol and the like), heterocyclic compounds (benzotriazole, PROXEL, 1,2-benzisothiazolin-3-one, and the like), acid amides, carbamic acid, carbamates, amidine/guanidines, pyridines (sodium pyridinethione-1-oxide, and the like), diazines, triazines, pyrrole/imidazoles, oxazole/oxazines, thiazole/thiadiazines, thioureas, thiosemicarbazides, dithiocarbamates, sulfides, sulfoxides, sulfones, sulfamides, antibiotics (penicillin, tetracycline, and the like), sodium dehydroacetate, sodium benzoate, p-hydroxybenzoic acid ethyl ester, and salts thereof can be used.

Furthermore, regarding the preservative, those described in Bokin Bobi Handobukku (Handbook of antibacterial and antifungal agents) (Gihodo Shuppan Co., Ltd.: 1986), "Bokin Bobi-zai Jiten (Encyclopedia of antibacterial and antifungal agents)" (edited by the Encyclopedia editorial committee of the Society for Antibacterial and Antifungal Agents, Japan), and the like can also be used.

Regarding these compounds, various compounds such as compounds having an oil-soluble structure and compounds having a water-soluble structure can be used; however, preferred ones are water-soluble compounds.

Regarding the preservative, a phenol derivative or a heterocyclic compound is preferred, and a heterocyclic compound is more preferred.

The heterocyclic compound is preferably a thiazole-based compound or a benzotriazole-based compound. Among preservatives, thiazole-based compounds function as fungicides in particular. Examples of the thiazole-based compounds include benzisothiazoline, isothiazoline, 1,2-benzisothiazolin-3-one, 5-chloro-2-methyl-4-isothiazolin-3-one, 2-(thiocyanomethylthio)benzothiazole, 2-mercaptobenzothiazole, and 3-allyloxy-1,2-benzisothiazole-1,1-oxide. Furthermore, as thiazole-based fungicides, PROXEL (registered trademark) series (BDN, BD20, GXL, LV, XL2, Ultra10, and the like) that are manufactured and sold by Arch Chemicals, Inc. can also be used.

Among preservatives, benzotriazole-based compounds function as rust inhibitors in particular, and for example, the generation of rust caused by, as one of the causes, the contact between the metal material that constitutes an inkjet head (particularly 42 alloy (nickel-iron alloy containing 42% nickel)) and an ink, can be prevented. Examples of the benzotriazole-based compounds include 1H-benzotriazole, 4-methyl-1H-benzotriazole, 5-methyl-1H-benzotriazole, and sodium salts or potassium salts thereof.

The preservatives can be added singly or in combination of two or more kinds thereof, to an aqueous solution.

It is preferable that the preservative is at least one selected from the group consisting of a heterocyclic compound, a phenol derivative, a phenoxy ether derivative, and an alkanediol; and it is more preferable that at least one of the preservatives is a heterocyclic compound.

It is even more preferable that the preservative is a heterocyclic compound, and the heterocyclic compound is a thiazole-based compound or a benzotriazole-based compound.

The content of the preservative in the pigment dispersion liquid can be used in a wide range; however, the content is preferably 0.01% to 20% by mass, more preferably 0.1% to 10% by mass, and even more preferably 0.5% to 5% by mass, with respect to the pigment.

(Method for Producing Pigment Dispersion Liquid)

The pigment dispersion liquid according to the embodiment of the invention can be produced by mixing a pigment, a polymer dispersant, water, and other components as necessary. The various components may be mixed simultaneously or in any sequence. Furthermore, the other components may be added to the above-mentioned mixture. It is preferable to perform membrane purification.

At the time of mixing various components and dispersing the pigment, for example, a ball mill, a roll mill, a sand grinder mill, a gravel mill, a high pressure homogenizer, or a high-speed stirring type dispersing machine can be used.

The pigment dispersion liquid according to the embodiment of the invention is such that the volume average particle size (Mv) of the pigment particles (hereinafter, also simply referred to as average particle size) is preferably 20 to 250 nm, and more preferably 40 to 100 nm. In a case in which the average particle size is 20 nm or larger, the particles are not too small, and voids are not likely to appear in the printed materials. In a case in which the average particle size is 250 nm or less, clogging of nozzles is not likely to occur, and excellent jettability is obtained. Furthermore, since the specific surface area of the particles becomes larger, the concentration increases, which is preferable.

The volume average particle size of the pigment particles means the particle size of the pigment itself, or in a case in which additives such as a dispersant are adhering to the pigment, the volume average particle size means the particle size of particles including the adhering additives. According to the invention, a NanoTrac UPA particle size analyzer (UPA-EXI50; manufactured by Nikkiso Co., Ltd.) can be used as the apparatus for measuring the volume average particle size of the pigment particles.

[Inkjet Ink]

The inkjet ink according to the embodiment of the invention includes the pigment dispersion liquid according to the embodiment of the invention. The inkjet ink may include various components in addition to the pigment dispersion liquid, and examples include known additives such as a solvent (aqueous solvent), an anti-drying agent (wetting agent), a discoloration preventer, an emulsion stabilizer, a penetration enhancer, an ultraviolet absorber, a fungicide, a pH adjusting agent, a surface tension adjuster, an antifoaming agent, a viscosity-adjusting agent, a dispersant, a dispersion stabilizer, a rust inhibitor, and a chelating agent (described in JP2003-306623A). These various additives are directly added to the ink liquid in the case of a water-soluble ink. In the case of an oil-soluble ink, it is general to add the various additives to a dispersion liquid after a pigment dispersion liquid is produced; however, it is also acceptable to add the additives to the oil phase or the water phase at the time of production.

The content of the pigment in the inkjet ink according to the embodiment of the invention is preferably 2% to 15% by mass.

EXAMPLES

Hereinafter, the invention will be described more specifically by way of Examples. The materials, amounts of use, proportions, treatments, procedures, and the like shown in the following Examples can be modified as appropriate, as long as the purpose of the invention is maintained. Therefore, the scope of the invention is not limited to the specific examples disclosed below. Unless particularly stated otherwise, the units "parts" and "percent (%)" are on a mass basis.

Synthesis Example 1

6.1 g of PERBUTYL O (manufactured by NOF Corporation) was added to 186.0 g of dipropylene glycol (DPG), the mixture was stirred, and thus an initiator solution was produced.

Separately, 298.2 g of benzyl methacrylate, 61.9 g of methacrylic acid, and 11.9 g of butyl 3-mercaptopropionate as a chain transfer agent were added to 139.5 g of DPG, the mixture was stirred, and thus a monomer solution was produced.

241.5 g of DPG was introduced into a 2-L three-necked flask, and under a nitrogen stream, the internal temperature was raised to 85° C. Addition of the initiator solution and the monomer solution thereto was begun simultaneously, and the solutions were added over 5 hours and 4 hours, respectively. After completion of the addition of the initiator solution, the mixture was stirred for 2 hours at 85° C. and then was cooled to 70° C. 64.5 g of a 50 mass % aqueous solution of potassium hydroxide, 43.8 g of water, and 27.4 g of DPG were added to the mixture, and the resulting mixture was stirred for 2 hours at 70° C. Thus, a DPG solution of polymer dispersant H1 was obtained. 990 g of water was added thereto, and the mixture was stirred for 2 hours. Thus, 1,995 g of a DPG-water mixed solution of polymer dispersant H1 (dispersant solution 1) was obtained. The solid content concentration of the dispersant solution 1 was 20.1% by mass.

50 mL of isopropanol was stirred, and 5 mL of dispersant solution 1 was added dropwise thereto. A solid precipitated therefrom was filtered, and then the solid was washed out with 20 mL of isopropanol and dried at 50° C. This was measured by a high-frequency inductively coupled plasma (ICP) emission spectrometric analysis, and since 0.55% of sulfur atoms existed therein, it was confirmed that a structure derived from the chain transfer agent had been introduced into the polymer molecules of polymer dispersant H1. Furthermore, the weight-average molecular weight (Mw) of the polymer dispersant H1 was 8,000, and the acid value was 1.9 mmol/g.

The polymer dispersant H1 includes a polymer having the following structure, in which at least one terminal of the main chain has a structure represented by Formula (H1-3). The ratio of the repeating units is a molar ratio. The symbol * in Formula (H1-3) represents a linking bond.

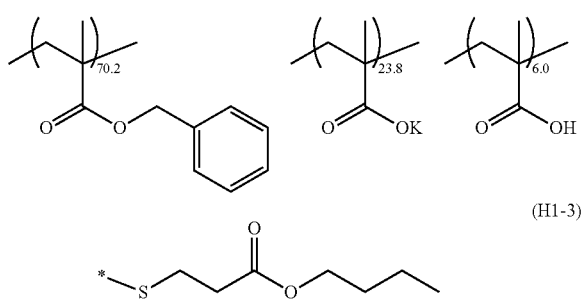

(H1-3)

In regard to polymer dispersants H2 to H5 and H8 to H17, the polymer dispersants were synthesized in the same manner as in Synthesis Example 1, except that the raw material monomer species of the polymer dispersants and compositions thereof (mol %) shown in Synthesis Example 1, the chain transfer agent species, the molar ratio between the monomers and the chain transfer agent (monomers/chain transfer agent), the initiator species, and the polymerization solvent species were changed as shown in the following Table 1 and Table 2.

Synthesis Example 2

2.7 g of V-601 (manufactured by Wako Pure Chemical Industries, Ltd.) was added to 77.2 g of triethylene glycol (TEG), the mixture was stirred to completely dissolve, and thus an initiator solution was produced.

Separately, 123.7 g of benzyl methacrylate, 25.7 g of methacrylic acid, and 4.9 g of butyl 3-mercaptopropionate as a chain transfer agent were added to 57.9 g of TEG, the mixture was stirred, and thus a monomer solution was produced.

100.3 g of TEG was introduced into a 1-L three-necked flask, and under a nitrogen stream, the internal temperature was raised to 80° C. Addition of the initiator solution and the monomer solution thereto was begun simultaneously, and the solutions were added over 5 hours and 4 hours, respectively. After completion of the addition of the initiator solution, the mixture was stirred for 2 hours at 85° C. and then was cooled to 70° C. 26.8 g of a 50 mass % aqueous solution of potassium hydroxide, 18.2 g of water, and 11.3 g of TEG were added to the mixture, and the mixture was stirred for 2 hours at 70° C. Thus, a TEG solution of polymer dispersant H7 was obtained. 380 g of water was added thereto, and the mixture was stirred for 2 hours. Thus, 825 g of a TEG-water mixed solution of polymer dispersant H7 (dispersant solution 7) was obtained. The solid content concentration of the dispersant solution 7 was 20.2% by mass.

50 mL of isopropanol was stirred, and 5 mL of the dispersant solution 7 was added dropwise thereto. A solid precipitated therefrom was filtered, and then the solid was washed out with 20 mL of isopropanol and dried at 50° C. This was measured by a high-frequency inductively coupled plasma (ICP) emission spectrometric analysis, and since 0.50% of sulfur atoms existed therein, it was confirmed that a structure derived from the chain transfer agent had been introduced into the polymer molecules of the polymer dispersant H7. Furthermore, the weight-average molecular weight (Mw) of the polymer dispersant H7 was 8,000, and the acid value was 1.9 mmol/g.

In regard to polymer dispersant H6, the polymer dispersant was synthesized in the same manner as in Synthesis Example 2, except that the monomer composition (mol %) of the raw material monomers of the polymer dispersant shown in Synthesis Example 2, and the molar ratio between the monomers and the chain transfer agent (monomers/chain transfer agent) were changed as shown in the following Table 1.

Synthesis Example 3

9.0 g of PERBUTYL O was added to 276.8 g of 1,2-hexanediol (1,2-HDO), the mixture was stirred, and thus an initiator solution was produced. Separately, 438.0 g of benzyl methacrylate, 92.0 g of methacrylic acid, and 23.5 g of 2-ethylhexyl 3-mercaptopropionate were added to 207.6 g of 1,2-HDO, the mixture was stirred, and thus a monomer solution was produced.

359.5 g of 1,2-HDO was introduced into a 3-L three-necked flask, and under a nitrogen stream, the internal temperature was raised to 85° C. Addition of the initiator solution and the monomer solution thereto was initiated simultaneously and was continued for 5 hours and 4 hours, respectively. After completion of the addition of the initiator solution, the mixture was stirred for 2 hours at 85° C. and then was cooled to 70° C. 96.0 g of a 50 mass % aqueous solution of potassium hydroxide, 65.2 g of water, and 40.7 g of 1,2-HDO were added to the mixture, and the resulting mixture was stirred for 2 hours at 70° C. 1,367 g of water was added thereto, and the mixture was stirred for 2 hours. Thus, 2,975 g of a 1,2-HDO-water mixed solution of polymer dispersant H18 (dispersant solution 18) was obtained. The solid content concentration of the dispersant solution 18 was 19.8% by mass.

50 mL of isopropanol was stirred, and 5 mL of the dispersant solution 18 was added dropwise thereto. A solid precipitated therefrom was filtered, and then the solid was washed out with 20 mL of isopropanol and dried at 50° C. This was measured by a high-frequency inductively coupled plasma (ICP) emission spectrometric analysis, and since 0.57% of sulfur atoms existed therein, it was confirmed that a structure derived from the chain transfer agent had been introduced into the polymer molecules of the polymer dispersant H18. Furthermore, the weight-average molecular weight (Mw) of the polymer dispersant H18 was 8,500, and the acid value was 1.9 mmol/g.

In regard to polymer dispersants H19 to H23, the polymer dispersants were synthesized in the same manner as in Synthesis Example 3, except that the raw material monomer species and molar ratio of the polymer dispersants, the chain transfer agent species, and the polymerization solvent species shown in Synthesis Example 3 were changed as shown in the following Table 3.

The raw material monomer species used and compositions thereof (mol %), the chain transfer agent species, the molar ratio between the monomers and the chain transfer agent (monomers/chain transfer agent), the initiator species, and the polymerization solvent species are shown in the following Table 1 to Table 3. The weight-average molecular weights and acid values of the polymer dispersants are also shown in Table 1 to Table 3.

Meanwhile, polymer dispersant HR1 was synthesized according to Synthesis Example (1)-6 described in JP2014-162875A. Polymer dispersant HR2 was synthesized according to Synthesis Example 112 described in JP2011-074376A. Furthermore, polymer dispersant HR3 was synthesized in the same manner as in Synthesis Example 1, except that the raw material monomer species and composition thereof (mol %), the chain transfer agent species, and the molar ratio between the monomers and the chain transfer agent (monomers/chain transfer agent) were changed as shown in the following Table 2.

TABLE 1

| Polymer dispersant | Monomer composition (mol %) | Chain transfer agent | Monomers/chain transfer agent (molar ratio) | Initiator | Polymerization solvent | Acid value (mmol/g) | Mw |
|---|---|---|---|---|---|---|---|
| H1 | BnMA/MAA = 70.2/29.8 | BMPA | 33 | PERBUTYL O | DPG | 1.9 | 8,000 |
| H2 | BnMA/MAA = 70.2/29.8 | 2-EHMPA | 33 | PERBUTYL O | DPG | 1.9 | 8,000 |
| H3 | BnMA/MAA = 70.2/29.8 | MMPA | 33 | PERBUTYL O | DPG | 1.9 | 8,000 |
| H4 | BnMA/MAA = 70.6/29.4 | BMPA | 67 | PERBUTYL O | DPG | 1.9 | 15,000 |
| H5 | BnMA/MAA = 70.7/29.3 | BMPA | 93 | PERBUTYL O | DPG | 1.9 | 25,000 |
| H6 | BnMA/MAA = 70.7/29.3 | BMPA | 93 | V-601 | TEG | 1.9 | 25,000 |
| H7 | BnMA/MAA = 70.2/29.8 | BMPA | 33 | V-601 | TEG | 1.9 | 8,000 |
| H8 | BnMA/MMA/MAA = 64.1/7.0/28.9 | BMPA | 33 | PERBUTYL O | DPG | 1.9 | 7,500 |
| H9 | BnMA/MAA = 72.9/27.1 | BMPA | 33 | PERBUTYL O | DPG | 1.7 | 8,000 |
| H10 | BnMA/MAA = 67.6/32.4 | BMPA | 33 | PERBUTYL O | DPG | 2.1 | 7,900 |

TABLE 2

| Polymer dispersant | Monomer composition (mol %) | Chain transfer agent | Monomers/chain transfer agent (molar ratio) | Initiator | Polymerization solvent | Acid value (mmol/g) | Mw |
|---|---|---|---|---|---|---|---|
| H11 | BnMA/MAA = 62.5/37.5 | BMPA | 33 | PERBUTYL O | DPG | 2.5 | 7,800 |
| H12 | 2-Phenoxyethyl methacrylate/MAA = 65.5/34.5 | BMPA | 33 | PERBUTYL O | DPG | 2.0 | 8,500 |
| H13 | BnMA/MAA = 58.9/41.1 | BMPA | 33 | PERBUTYL O | DPG | 2.8 | 8,000 |
| H14 | BnMA/MAA = 75.7/24.3 | BMPA | 33 | PERBUTYL O | DPG | 1.5 | 8,000 |
| H15 | BnA/AA = 72.5/27.5 | BMPA | 33 | PERBUTYL O | DPG | 1.9 | 7,500 |
| H16 | BnMA/MAA = 69.3/30.7 | BMPA | 15 | PERBUTYL O | DPG | 1.9 | 4,800 |
| H17 | BnMA/MAA = 69.9/30.1 | BMPA | 22 | PERBUTYL O | DPG | 1.9 | 6,400 |
| HR1 | BnMA/MAA = 70.2/29.8 | None | — | PERBUTYL O | DPG | 1.9 | 31,000 |
| HR2 | BnMA/monomer A/MAA/macromer A = 38/30/7/25 | 3-MPA | 60 | V-601 | MEK | 0.9 | 134,400 |
| HR3 | BnMA/MAA = 72.3/27.7 | 3-MPA | 53 | PERBUTYL O | DPG | 1.9 | 14,300 |

TABLE 3

| Polymer dispersant | Monomer composition (mol %) | Chain transfer agent | Monomers/chain transfer agent (molar ratio) | Initiator | Polymerization solvent | Acid value (mmol/g) | Mw |
|---|---|---|---|---|---|---|---|
| H18 | BnMA/MAA = 69.9/30.1 | 2-EHMPA | 33 | PERBUTYL O | 1,2-HDO | 1.9 | 8,500 |
| H19 | BnMA/MAA = 70.2/29.8 | BMPA | 33 | PERBUTYL O | 1,2-HDO | 1.9 | 8,500 |
| H20 | BnMA/MAA = 70.3/29.7 | 2-EHMPA | 48 | PERBUTYL O | 1,2-HDO | 1.9 | 11,000 |
| H21 | BnMA/MAA = 68.0/32.0 | 2-EHMPA | 22 | PERBUTYL O | 1,2-HDO | 2.0 | 6,800 |
| H22 | BnMA/MAA = 69.9/30.1 | 2-EHMPA | 33 | V-601 | 1,2-HDO | 1.9 | 8,300 |
| H23 | BnMA/MAA = 69.9/30.1 | 2-EHMPA | 33 | PERBUTYL O | Hexylene glycol | 1.9 | 8,500 |

The compounds described with the abbreviations used in the above Table 1 to Table 3 are as follows.
BnMA: Benzyl methacrylate
MAA: Methacrylic acid
MMA: Methyl methacrylate
Monomer A: Octoxypropylene glycol polypropylene glycol monomethacrylate described in paragraph [0237] of JP2011-074376A
Macromer A: Styrene macromer described in paragraph [0237] of JP2011-074376A
AA: Acrylic acid
BnA: Benzyl acrylate
BMPA: Butyl 3-mercaptopropionate
2-EHMPA: 2-Ethylhexyl 3-mercaptopropionate
MMPA: Methyl 3-mercaptopropionate
3-MPA: 3-Mercaptopropionic acid
DPG: Dipropylene glycol
TEG: Triethylene glycol
MEK: Methyl ethyl ketone
1,2-HDO: 1,2-Hexanediol Example 1

30.2 g of water and 28.6 g of a powdered pigment formed from a compound represented by Formula (d1) described above (azo pigment (d1)) were added to 74.4 g of the DPG-water mixed solution of polymer dispersant H1 (dispersant solution 1), and the mixture was mixed. This was dispersed for 4 hours with a vertical type bead mill, TSG-4U (manufactured by Imex Co., Ltd.), using 375 g of zirconia beads having a diameter of 0.1 mm at 1,500 rotations per minute (rpm). After completion of dispersing, the beads were separated using a filter cloth, and the beads were washed using ultrapure water. Thus, 166 g of Pigment dispersion liquid 1 (pigment concentration: 13.69% by mass) was obtained.

45 g of water was added to Pigment dispersion liquid 1 thus obtained, and the internal temperature was raised to 90° C. The mixture was stirred for 12 hours. The mixture was cooled to an internal temperature of 45° C. over one hour and 30 minutes. 210 g of water was added thereto, and coarse particles were settled with a centrifuge. A solid thus settled was removed, and then purification was performed by a cross-flow filtration method using an ultrafiltration membrane having a molecular cutoff of 50,000. The pigment dispersion liquid was concentrated to a pigment concentration of 10% by mass. The concentrate was heated for one hour at an internal temperature of 70° C. and was cooled to room temperature. Subsequently, the pigment dispersion liquid was passed through a filter having a pore size of 1.0 μm, and thus 150 g of Pigment dispersion liquid (S1) (pigment concentration: 10.1% by mass) was obtained.

The following components were mixed and sufficiently stirred, and the mixture was passed through a filter having a pore size of 0.8 μm. Thus, inkjet ink (1) was produced.

| | |
|---|---|
| Pigment dispersion liquid (S1) | 50.4 g |
| Ultrapure water | 21.9 g |
| 2-Pyrrolidinone | 3.1 g |
| Glycerol | 15.0 g |
| 1,2-Hexanediol | 4.0 g |
| Ethylene glycol | 5.1 g |
| SURFYNOL 465 | 0.5 g |

SURFYNOL 465 is a surfactant manufactured by Nissin Chemical Industry Co., Ltd.

Example 7

31.3 g of water and 27.7 g of powdered azo pigment (d1) were added to 66.2 g of the TEG-water mixed solution of polymer dispersant H7 (dispersant solution 7), and the mixture was mixed. This was dispersed for 5 hours with a vertical type bead mill, TSG-4U (manufactured by Imex Co., Ltd.), using 375 g of zirconia beads having a diameter of 0.1 mm at 1.500 rpm. After completion of dispersing, the beads were separated using a filter cloth, and the beads were washed using ultrapure water. Thus, 188 g of Pigment dispersion liquid 7 (pigment concentration: 11.9% by mass) was obtained.

25 g of water was added to Pigment dispersion liquid 7 thus obtained, and the internal temperature was raised to 90° C. The mixture was stirred for 12 hours. The mixture was cooled to an internal temperature of 45° C. over one hour and 30 minutes. Coarse particles were settled with a centrifuge, and a solid thus settled was removed. The pigment dispersion liquid was passed through a filter having a pore size of 0.3 μm and thus 184 g of Pigment dispersion liquid (S7) (pigment concentration: 10.0% by mass) was obtained.

Example 20

65.8 g of water and 18.2 g of powdered azo pigment (d1) were added to 46.0 g of the 1,2-HDO-water mixed solution of polymer dispersant H18 (dispersant solution 18), and the mixture was mixed. This was dispersed for 2 hours with a vertical type bead mill, TSG-4U (manufactured by Imex Co., Ltd.), using 375 g of zirconia beads having a diameter of 0.1 mm at 1,500 rpm. After completion of dispersing, the beads were separated using a filter cloth, and the beads were washed using ultrapure water. Thus, 138 g of Pigment dispersion liquid 18 (pigment concentration: 10.93% by mass) was obtained.

10 g of water was added to Pigment dispersion liquid 18 thus obtained, and the internal temperature was raised to 90° C. The mixture was stirred for 12 hours. The mixture was cooled to an internal temperature of 45° C. over one hour and 30 minutes. 145 g of water was added thereto, and coarse particles were settled with a centrifuge. A solid thus settled was removed, and then purification was performed by a cross-flow filtration method using an ultrafiltration membrane having a molecular cutoff of 50,000. The pigment dispersion liquid was concentrated to a pigment concentration of 10% by mass. The concentrate was heated for one hour at an internal temperature of 70° C. and was cooled to room temperature. Subsequently, the pigment dispersion liquid was passed through a filter having a pore size of 1.0 μm, and thus 115 g of Pigment dispersion liquid (S18) (pigment concentration: 10.1% by mass) was obtained.

Examples 2 to 6, 8 to 19, 21 to 25, and Comparative Examples 1 to 5

Pigment dispersion liquids (S2) to (S5) and (S8) to (S19) of Examples 2 to 5 and 8 to 19 were produced in the same manner as in Example 1, except that the pigment and polymer dispersant used in Example 1 were changed to the pigments and polymer dispersants shown in the following Table 4. Furthermore, Pigment dispersion liquid (S6) of Example 6 was produced in the same manner as in Example 7, except that the pigment and polymer dispersant used in Example 7 were changed to the pigment and polymer dispersant shown in the following Table 4.

Pigment dispersion liquids (S21) to (S25) of Examples 21 to 25 were produced in the same manner as in Example 20, except that the pigment and polymer dispersant used in Example 20 were changed to the pigment and polymer dispersant shown in the following Table 4.

In regard to Comparative Examples 1 and 2, pigment dispersion liquids (SR1) and (SR2) were produced according to Example (1)-16 and Example (1)-1 described in JP2014-162875A, respectively. In regard to Comparative Example 3, Pigment dispersion liquid (SR3) was produced according to Example 2 described in JP2011-074376A. In regard to Comparative Examples 4 and 5, pigment dispersion liquids (SR4) and (SR5) were produced in the same manner as in Example 1, except that the pigment and polymer dispersant used in Example 1 were changed to the pigments and polymer dispersants shown in the following Table 4.

Furthermore, inkjet inks (2) to (25) of Examples and Comparative inkjet inks (R1) to (R5) were produced in the same manner as in Example 1, using the pigment dispersion liquids (S2) to (S25) of Examples and the pigment dispersion liquids (SR1) to (SR5) of Comparative Examples thus obtained.

(Evaluation)

For the inkjet inks obtained in the respective Examples and respective Comparative Examples, continuous jetting properties, drop velocity, and light resistance were evaluated by the following methods. The dispersibility of pigment particles was also evaluated. In regard to the evaluation, the ink of BC340 manufactured by Canon, Inc. was refilled with each of the inks obtained in the various Examples and Comparative Examples, and the ink was evaluated using an inkjet printer, PIXUS MG3130, manufactured by Canon, Inc.

—Continuous Jetting Properties—

A solid image was printed on 100 sheets of ordinary A4 (210 mm×297 mm) paper, and then the nozzles were observed with an optical microscope. A case in which the number of clogged nozzles was less than 5% of all the nozzles was rated as A; a case in which the number of clogged nozzles was 5% or more and less than 10% was rated as B; a case in which the number of clogged nozzles was 10% or more and less than 15% was rated as C; a case in which the number of clogged nozzles was 15% or more and less than 20% was rated as D; and a case in which the number of clogged nozzles was 20% or more was rated as E. The nozzles were observed with an optical microscope, and a nozzle having a clogged area of 30% or more was designated as "clogged nozzle".

—Drop Velocity—

Liquid droplets during jetting were observed by imaging the droplets with a camera. By taking the drop velocity of Example (1)-1 (Comparative Example 2) described in JP2014-162875A as a reference value, a case in which the drop velocity was +20% or more with respect to the reference was rated as A; a case in which the drop velocity was less than +20% and 10% or more was rated as B; a case in which the drop velocity was less than 10% and −10% or more was rated as C, and a case in which the drop velocity was less than −10% was rated as D.

—Light Resistance—

A monochromatic yellow image having a stepwise color density was printed using the above-described printer. As a recording medium, KASAI PHOTO FINISH PRO manufactured by Fujifilm Corporation was used. For the measurement of optical density (OD), a reflection densitometer (GRETAG MACBETH Spectrolino) was used. The printed materials were irradiated using a xenon weather meter (manufactured by Suga Test Instruments Co., Ltd.) at 9.9 kw for 14 days under filter conditions. With regard to an image area having an OD of 1 before irradiation, the residual ratio of colorant [(density after irradiation/density before irradiation)×100%] was determined, and thereby, light resistance (light fastness) was evaluated.

A . . . The residual ratio of colorant was 95% or more.

B . . . The residual ratio of colorant was less than 95% and 85% or more.

C . . . The residual ratio of colorant was less than 85% and 70% or more.

D . . . The residual ratio of colorant was less than 70%.

—Dispersibility—

Dispersibility was evaluated, during a dispersing process for pigment particles at the time of producing each pigment dispersion liquid (pigment dispersion liquids 1 to 25 for Examples 1 to 25) before the removal of coarse particles with a centrifuge, by measuring the dispersing time taken for the volume average particle size of the pigment particles to reach 90 nm or less. A shorter dispersing time is preferable from the viewpoint of energy saving.

A . . . less than 3 hours

B . . . 3 hours or more and less than 4.5 hours

C . . . 4.5 hours or more and less than 6 hours

D . . . 6 hours or more

TABLE 4

| | Pigment | Polymer dispersant | Evaluation | | | |
|---|---|---|---|---|---|---|
| | | | Continuous jetting properties | Drop velocity | Light resistance | Dispersibility |
| Example 1 | Formula (d1) | H1 | A | A | A | B |
| Example 2 | Formula (d1) | H2 | A | A | A | B |
| Example 3 | Formula (d1) | H3 | A | A | A | B |
| Example 4 | Formula (d1) | H4 | A | A | A | B |
| Example 5 | Formula (d1) | H5 | A | B | A | C |
| Example 6 | Formula (d1) | H6 | A | A | A | C |
| Example 7 | Formula (d1) | H7 | A | A | A | B |
| Example 8 | Formula (d2) | H1 | A | A | A | B |
| Example 9 | Formula (d3) | H1 | A | A | A | B |
| Example 10 | Formula (d1) | H8 | A | A | A | B |
| Example 11 | Formula (d1) | H9 | A | A | A | B |
| Example 12 | Formula (d1) | H10 | A | A | A | B |
| Example 13 | Formula (d1) | H11 | B | A | A | B |
| Example 14 | Formula (d1) | H12 | A | A | A | B |

TABLE 4-continued

| | Pigment | Polymer dispersant | Continuous jetting properties | Drop velocity | Light resistance | Dispersibility |
|---|---|---|---|---|---|---|
| Example 15 | Formula (d1) | H13 | C | A | A | B |
| Example 16 | Formula (d1) | H14 | C | A | A | B |
| Example 17 | Formula (d1) | H15 | B | A | A | B |
| Example 18 | Formula (d1) | H16 | C | A | B | B |
| Example 19 | Formula (d1) | H17 | B | A | A | B |
| Example 20 | Formula (d1) | H18 | A | A | A | A |
| Example 21 | Formula (d1) | H19 | A | A | A | A |
| Example 22 | Formula (d1) | H20 | A | A | A | A |
| Example 23 | Formula (d1) | H21 | A | A | A | A |
| Example 24 | Formula (d1) | H22 | A | A | A | A |
| Example 25 | Formula (d1) | H23 | A | A | A | A |
| Comparative Example 1 | Formula (d1) | HR1 | D | B | A | C |
| Comparative Example 2 | Formula (d1) | HR1 (further crosslinked) | A | C | A | C |
| Comparative Example 3 | Formula (d1) | HR2 | D | D | A | D |
| Comparative Example 4 | Formula (d1) | HR3 | D | B | A | B |
| Comparative Example 5 | P. Y. 74 | H1 | D | A | D | B |

In Table 4, regarding P. Y. 74, IRALITE YELLOW GO manufactured by Ciba Specialty Chemicals, Inc. was used.

From the results of Table 4, it was understood that in the inkjet inks produced using the pigment dispersion liquids according to the embodiment of the invention, the continuous jetting properties, drop velocity, and light resistance of the inks were all satisfactory.

Particularly, in Examples 20 to 25, since 1,2-hexanediol or hexylene glycol, which is believed to have high affinity with the pigment used, was used as the polymerization solvent for the polymer dispersant, excellent evaluation results for dispersibility were obtained while all of the objects of the invention were addressed.

According to the invention, a pigment dispersion liquid having excellent continuous jetting properties and excellent drop velocity at the time of printing images with an inkjet printer, and having excellent light resistance; and an inkjet ink can be provided.

The invention has been explained in detail with reference to particular embodiments; however, it is obvious to those having ordinary skill in the art that various modifications or alterations can be applied without deviating from the spirit and scope of the invention.

What is claimed is:

1. A pigment dispersion liquid comprising:

a pigment;

a polymer dispersant; and water, wherein the pigment is a pigment including a compound represented by General Formula (1), a tautomer thereof, or a salt of the compound or the tautomer, and the polymer dispersant includes a polymer compound having a repeating unit represented by General Formula (2-1) and a repeating unit represented by General Formula (2-2), and having a structure represented by General Formula (3) introduced into at least one terminal of a main chain,

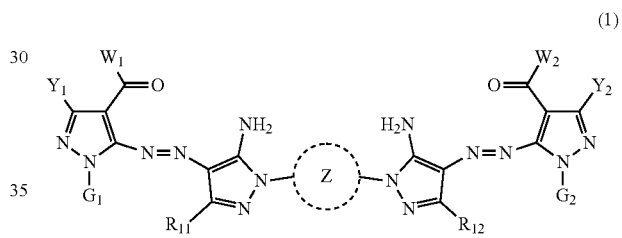

(1)

in General Formula (1),

Z represents a 5-membered heterocyclic ring or a 6-membered heterocyclic ring, both of which may have a substituent, $Y_1$, $Y_2$, $R_{11}$, and $R_{12}$ each independently represent a hydrogen atom or a substituent, $G_1$ and $G_2$ each independently represent a hydrogen atom, a substituted or unsubstituted alkyl group, a substituted or unsubstituted aralkyl group, a substituted or unsubstituted alkenyl group, a substituted or unsubstituted alkynyl group, a substituted or unsubstituted aryl group, or a substituted or unsubstituted heterocyclic group, and $W_1$ and $W_2$ each independently represent a substituted or unsubstituted alkoxy group, a substituted or unsubstituted amino group, a substituted or unsubstituted alkyl group, or a substituted or unsubstituted aryl group,

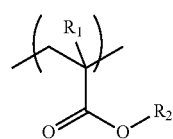

(2-1)

(2-2)

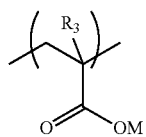

in General Formula (2-1), $R_1$ represents a hydrogen atom, a methyl group, or a substituted methyl group, and $R_2$ represents a substituted or unsubstituted alkyl group, a substituted or unsubstituted aralkyl group, or a substituted or unsubstituted aryl group, in General Formula (2-2), $R_3$ represents a hydrogen atom, a methyl group, or a substituted methyl group, and M represents a hydrogen atom or a counter cation, and (3)

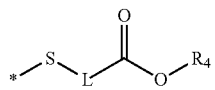

in General Formula (3), L represents a linking group, $R_4$ represents a substituted or unsubstituted alkyl group, a substituted or unsubstituted aryl group, or a substituted or unsubstituted heterocyclic group, and the symbol * represents a linking bond.

2. The pigment dispersion liquid according to claim 1, wherein the weight-average molecular weight of the polymer dispersant is 5,000 to 50,000.

3. The pigment dispersion liquid according to claim 1, wherein the weight-average molecular weight of the polymer dispersant is 7,000 to 20,000.

4. The pigment dispersion liquid according to claim 1, wherein the polymer dispersant has an acid value of from 1.6 mmol/g to 2.6 mmol/g.

5. The pigment dispersion liquid according to claim 1, wherein the polymer dispersant has an acid value of from 1.7 mmol/g to 2.2 mmol/g.

6. The pigment dispersion liquid according to claim 1, wherein the pigment is a pigment including at least one of a compound represented by Formula (d1), Formula (d2), or Formula (d3), a tautomer thereof, or a salt of the compound or the tautomer:

(d1)

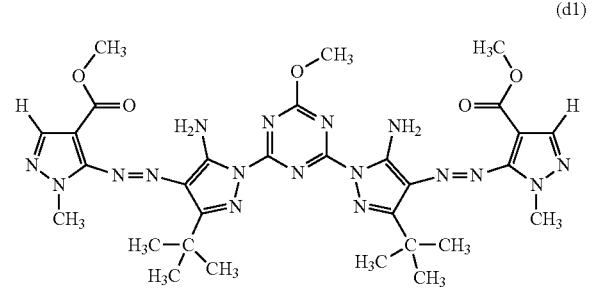

(d2)

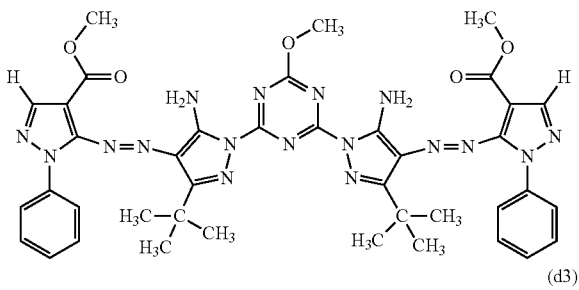

(d3)

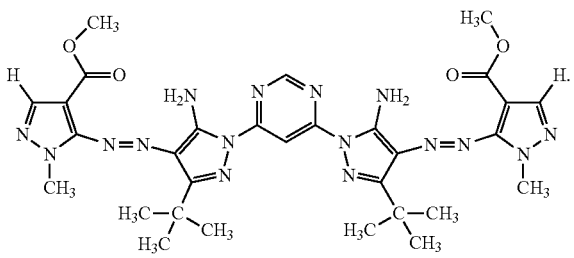

7. The pigment dispersion liquid according to claim 6, wherein the pigment is a pigment including a compound represented by Formula (d1), a tautomer thereof, or a salt of the compound or the tautomer.

8. The pigment dispersion liquid according to claim 1, wherein $R_4$ in General Formula (3) represents a substituted or unsubstituted alkyl group, or a substituted or unsubstituted aryl group.

9. The pigment dispersion liquid according to claim 1, wherein L in General Formula (3) represents a substituted or unsubstituted alkylene group, a substituted or unsubstituted arylene group, or a substituted or unsubstituted divalent heterocyclic group.

10. The pigment dispersion liquid according to claim 1, wherein $R_4$ in General Formula (3) represents a substituted or unsubstituted alkyl group having 1 to 10 carbon atoms.

11. The pigment dispersion liquid according to claim 1, wherein L in General Formula (3) represents a substituted or unsubstituted alkylene group having 1 to 5 carbon atoms.

12. The pigment dispersion liquid according to claim 1, wherein, in General Formula (2-1), $R_1$ represents a methyl group, and $R_2$ represents a benzyl group.

13. The pigment dispersion liquid according to claim 1, further comprising at least one solvent selected from glycerin, ethylene glycol, diethylene glycol, triethylene glycol, polyethylene glycol, 1,3-propanediol, 1,4-butanediol, 1,2-hexanediol, hexylene glycol, diglycerol, dipropylene glycol, 2-pyrrolidone, triethylene glycol monobutyl ether, propylene glycol monomethyl ether acetate, or isopropanol.

14. An inkjet ink comprising the pigment dispersion liquid according to claim 1.

* * * * *